(12) United States Patent
Goma et al.

(10) Patent No.: US 8,970,672 B2
(45) Date of Patent: Mar. 3, 2015

(54) THREE-DIMENSIONAL IMAGE PROCESSING

(75) Inventors: Sergiu R. Goma, San Diego, CA (US); Kalin M. Atanassov, San Diego, CA (US); Milivoje Aleksic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 706 days.

(21) Appl. No.: 13/079,752

(22) Filed: Apr. 4, 2011

(65) Prior Publication Data

US 2011/0292178 A1     Dec. 1, 2011

Related U.S. Application Data

(60) Provisional application No. 61/349,738, filed on May 28, 2010.

(51) Int. Cl.
*H04N 13/02* (2006.01)
*H04N 13/00* (2006.01)

(52) U.S. Cl.
CPC ....... *H04N 13/0022* (2013.01); *H04N 13/0003* (2013.01)
USPC .......................................................... 348/46

(58) Field of Classification Search
USPC .......................................................... 348/46
See application file for complete search history.

(56) References Cited

U.S. PATENT DOCUMENTS

| | | | |
|---|---|---|---|
| 4,323,925 A | 4/1982 | Abell et al. | |
| 5,649,250 A * | 7/1997 | Sasaki | 396/333 |
| 5,719,954 A * | 2/1998 | Onda | 382/154 |
| 5,870,137 A | 2/1999 | Stuettler | |
| 5,987,164 A * | 11/1999 | Szeliski et al. | 382/154 |
| 6,233,361 B1 | 5/2001 | Downs | |
| 6,278,480 B1 | 8/2001 | Kurahashi et al. | |
| 6,285,368 B1 * | 9/2001 | Sudo | 345/419 |
| 6,526,161 B1 * | 2/2003 | Yan | 382/118 |
| 6,584,219 B1 * | 6/2003 | Yamashita et al. | 382/154 |
| 6,606,406 B1 * | 8/2003 | Zhang et al. | 382/154 |
| 6,611,289 B1 | 8/2003 | Yu et al. | |

(Continued)

FOREIGN PATENT DOCUMENTS

| | | |
|---|---|---|
| EP | 0963122 A2 | 12/1999 |
| EP | 1662809 A1 | 5/2006 |

(Continued)

OTHER PUBLICATIONS

Jain et al.; Machin Vision cover page, 1995, McGraw-Hill, ISBN-0-07-032018-7.*

(Continued)

*Primary Examiner* — Sath V Perungavoor
*Assistant Examiner* — Peter D Le
(74) *Attorney, Agent, or Firm* — Espartaco Diaz Hidalgo

(57) ABSTRACT

Systems and methods of 3D image processing are disclosed. In a particular embodiment, a three-dimensional (3D) media player is configured to receive input data including at least a first image corresponding to a scene and a second image corresponding to the scene and to provide output data to a 3D display device. The 3D media player is responsive to user input including at least one of a zoom command and a pan command. The 3D media player includes a convergence control module configured to determine a convergence point of a 3D rendering of the scene responsive to the user input.

40 Claims, 16 Drawing Sheets

(56) References Cited

U.S. PATENT DOCUMENTS

| | | | |
|---|---|---|---|
| 6,665,440 B1 * | 12/2003 | Zhang et al. | 382/209 |
| 6,750,904 B1 | 6/2004 | Lambert | |
| 7,009,638 B2 | 3/2006 | Gruber et al. | |
| 7,112,774 B2 | 9/2006 | Baer | |
| 7,199,348 B2 | 4/2007 | Olsen et al. | |
| 7,305,180 B2 | 12/2007 | Labaziewicz et al. | |
| 7,319,720 B2 | 1/2008 | Abrams, Jr. | |
| 7,345,701 B2 | 3/2008 | Park et al. | |
| 7,525,576 B2 | 4/2009 | Kannermark et al. | |
| 7,561,191 B2 | 7/2009 | May et al. | |
| 2002/0113865 A1 * | 8/2002 | Yano et al. | 348/47 |
| 2002/0141635 A1 * | 10/2002 | Swift et al. | 382/154 |
| 2003/0179198 A1 | 9/2003 | Uchiyama | |
| 2003/0231788 A1 * | 12/2003 | Yukhin et al. | 382/115 |
| 2005/0117215 A1 * | 6/2005 | Lange | 359/462 |
| 2006/0140446 A1 * | 6/2006 | Luo et al. | 382/104 |
| 2006/0203085 A1 | 9/2006 | Tomita | |
| 2007/0047040 A1 * | 3/2007 | Ha | 359/24 |
| 2007/0081716 A1 * | 4/2007 | Ha et al. | 382/154 |
| 2007/0085903 A1 | 4/2007 | Zhang | |
| 2007/0146478 A1 | 6/2007 | Butler-Smith et al. | |
| 2007/0248260 A1 | 10/2007 | Pockett | |
| 2008/0024596 A1 | 1/2008 | Li et al. | |
| 2008/0031327 A1 | 2/2008 | Wang et al. | |
| 2008/0112616 A1 | 5/2008 | Koo et al. | |
| 2008/0240549 A1 | 10/2008 | Koo et al. | |
| 2009/0096863 A1 * | 4/2009 | Kim et al. | 348/42 |
| 2009/0244262 A1 * | 10/2009 | Masuda et al. | 348/46 |
| 2009/0268983 A1 | 10/2009 | Stone et al. | |
| 2011/0019048 A1 | 1/2011 | Raynor et al. | |

FOREIGN PATENT DOCUMENTS

| | | |
|---|---|---|
| JP | H08009421 A | 1/1996 |
| JP | H08317429 A | 11/1996 |
| JP | 2000209614 A | 7/2000 |
| JP | 2003018619 A | 1/2003 |
| JP | 2005073049 A | 3/2005 |
| JP | 2005167310 A | 6/2005 |
| WO | 9418789 | 8/1994 |
| WO | 9912127 | 3/1999 |
| WO | 0039998 | 7/2000 |
| WO | 2008016882 | 2/2008 |
| WO | 2008080156 | 7/2008 |

OTHER PUBLICATIONS

Jain et al., Machine Vision, 1995, McGraw-Hill, ISBN-0-07-032018-7.*

Gi-Mun UM et al: "A hierarchical stereo matching algorithm using wavelet representation based on edge and area information", Geoscience and Remote Sensing, 1997. IGARSS '97. Remote Sensing—A Scientific Vision for Sustainable Development., 1997 IEEE International Singapore Aug. 3-8, 1997, New York, NY, USA,IEEE, US, vol. 1, Aug. 3, 1997, pp. 588-590, XP010234864, DOI: DOI:10.1109/IGARSS.1997.615949 ISBN: 978-0-7803-3836-4.

International Search Report and Written Opinion—PCT/US2011/037779—ISA/EPO—Nov. 28, 2011.

Pridmore T P et al: "Exploiting Image-Plane Data in the Interpretation of Edge-Based Binocular Disparity", Computer Vision Graphics and Image Processing, Academic Press, Duluth, MA, US, vol. 52, No. 1, Oct. 1, 1990, pp. 1-25, XP000171414.

Wilburn, et al. "High Performance Imaging Using Large Camera Arrays", Stanford University, viewed May 20, 2010, 12 pp.

* cited by examiner

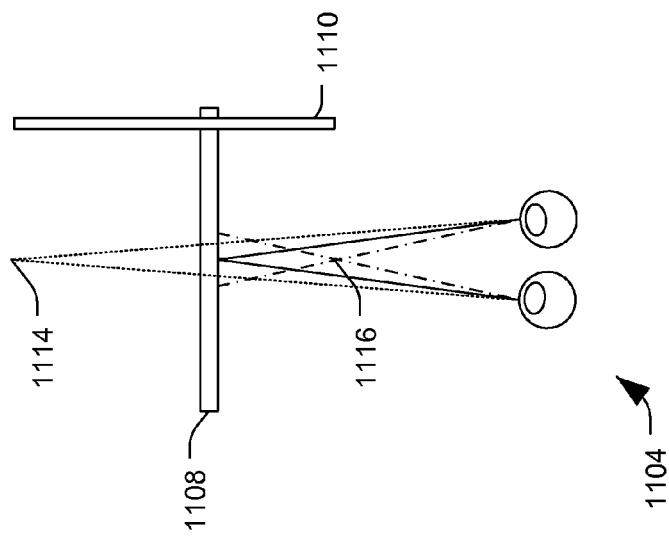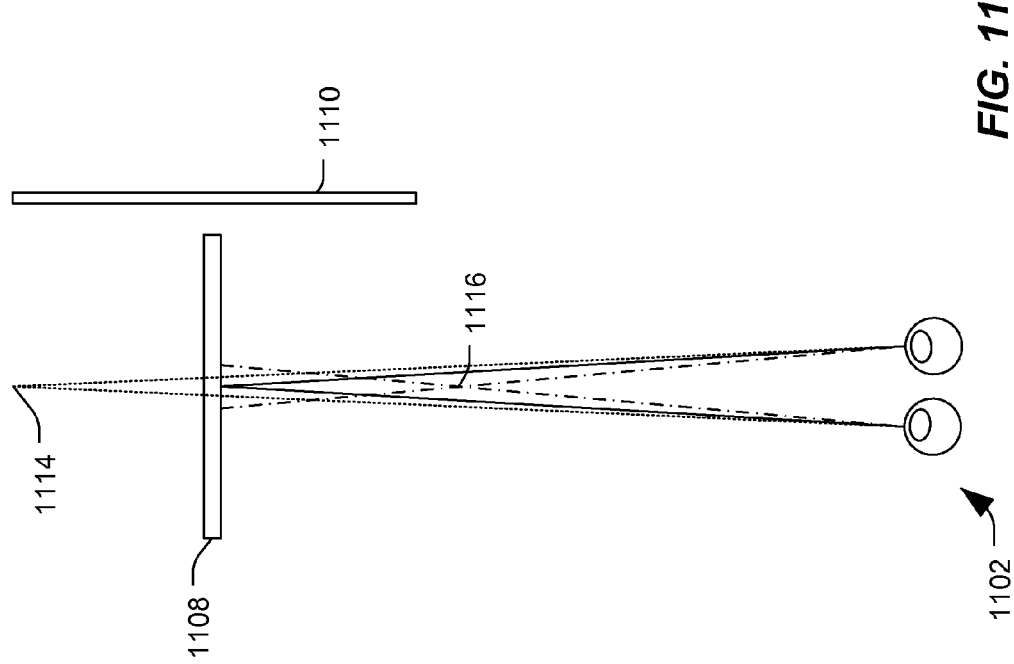
FIG. 11

THREE-DIMENSIONAL IMAGE PROCESSING

I. CLAIM OF PRIORITY

The present application claims priority to U.S. Provisional Patent Application No. 61/349,738, entitled "THREE-DIMENSIONAL IMAGE PROCESSING," filed May 28, 2010, incorporated herein by reference in its entirety.

II. FIELD

The present disclosure is generally related to three dimensional (3D) image processing.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. Many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a video file player.

IV. BRIEF DESCRIPTION OF THE DRAWINGS

FIG. 11 is a diagram of illustrative embodiments depicting disparity dependency on display viewing distance;

V. DETAILED DESCRIPTION

Systems and methods of three dimensional (3D) image processing are disclosed. A three-dimensional (3D) media player can receive input data corresponding to a scene and provide output data to a 3D display device. The 3D media player is responsive to user input including a zoom command and a pan command. The 3D media player includes a convergence control module configured to determine a convergence point of a 3D rendering of the scene responsive to the user input. The convergence point can be adaptively determined on a scene-by-scene basis and can be set according to a display scene geometry, viewing distance, and zoom/pan user input.

3D perception can occur in a viewer's mind as a result of fusing an object that appears in a left image of a scene and with a corresponding object that appears in a right image of the same scene. A perceived depth of the object is based on the object's disparity, i.e. a location shift of the object between the left and right images. Disparity (left and right) image shift plays a role in 3D effects and can produce discomfort/headache if not handled correctly. Display dimension and viewing distance affect disparity and can produce undesired effects if not compensated for. Zoom functionality can be an attribute to a 3D suite and also affects the disparity (in real time).

Disparity constraints may be configured based on user preferences. Scene-dependent disparity constraints can be derived in real time based on display size and distance and zoom factor. Scene disparity can be measured and if the scene disparity is within the constraints, a convergence point of the scene may be adjusted. If the scene disparity is not within constrains, processing may switch to a special mode to bring disparity within the constraints.

Special processing (3D effect control) may be used depending on one or more of: display viewing angle, display size, distance between viewer and display, and zoom factor. Consideration may be made to fully use an available range and to produce a 3D effect that is comfortable to the user.

Humans can only interpret (fuse) up to a certain angular disparity, after that ghosting appears (double images). An object's perceived depth may be solely dependent on the angular disparity. Angular disparity depends on a combination of screen size, screen resolution, and viewing distance.

Figure 1:
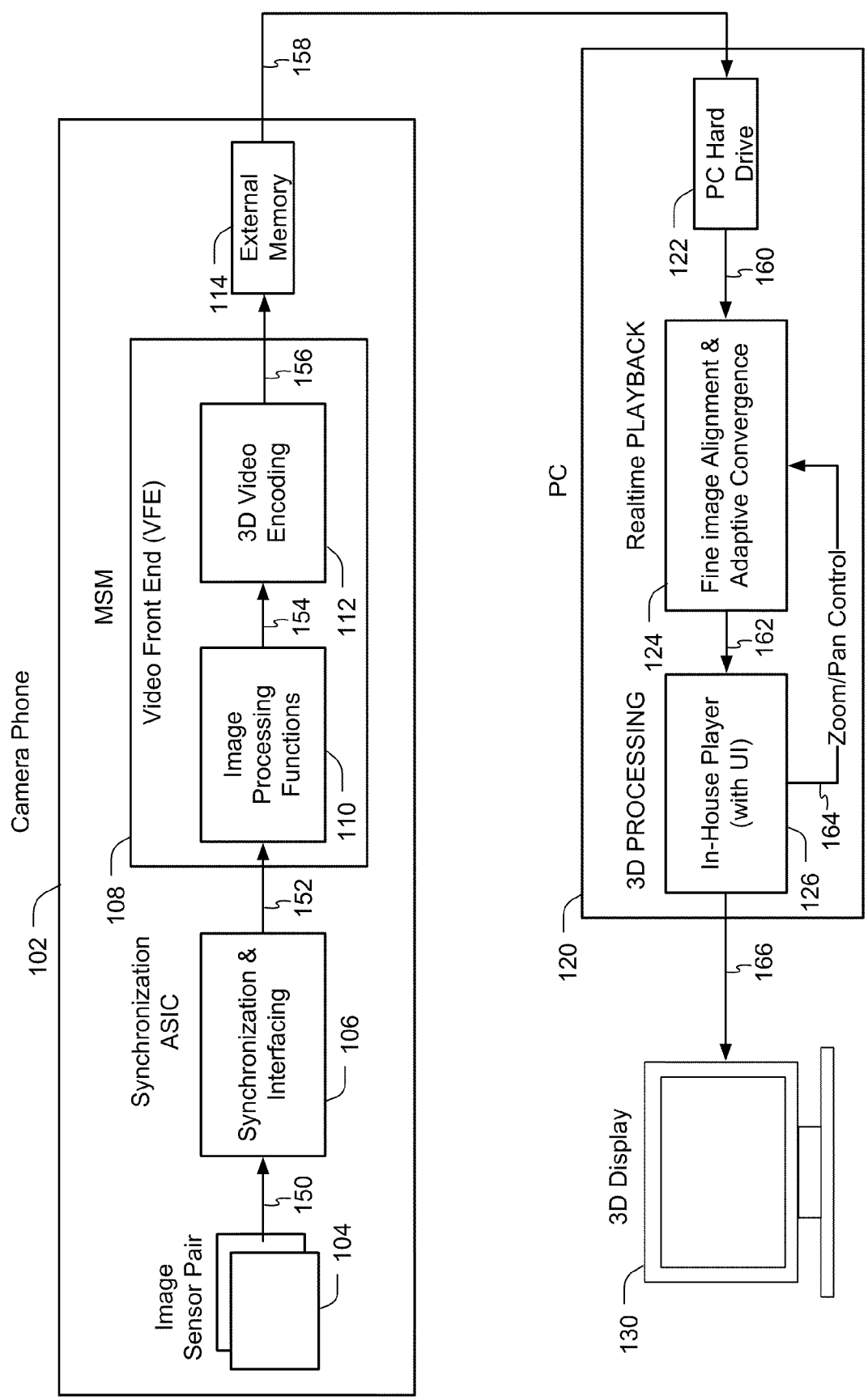
FIG. 1 is a block diagram of a particular embodiment of a system that includes a 3D playback device configured to perform adaptive convergence in response to a zoom or pan instruction during playback of a media file.

Referring to FIG. 1, a particular illustrative embodiment of a system includes a portable electronic device such as a camera phone 102 coupled to a computing device 120. In a particular embodiment, the computing device 120 is a personal computer that is coupled to a display device 130. The camera phone 102 is coupled to provide 3D image data 158 to the computing device 120 via an interface. The camera phone 102 includes an image sensor pair 104, a synchronization application-specific integrated circuit (ASIC), a video front end component 108, and external memory 114. The synchronization ASIC includes synchronization and interface functionality 106 and is responsive to the image sensor pair 104. The synchronization and interface functionality 106 receives image data 150 which includes first and second image data from the image sensor pair 104. The video front end component 108 is coupled to the synchronization ASIC and includes one or more image processing functions 110 and 3D video encoding functionality 112. The video front end component 108 provides video encoded data 156 to the external memory 114. The video front end component 108 may be included in a mobile device chipset, such as a Mobile Station Modem™ (MSM™)-type chipset that may also enable wireless connectivity and application processing capability at the camera phone 102. (Mobile Station Modem and MSM are trademarks of Qualcomm Incorporated.)

The computing device 120 includes an in-house player with a user interface 126, a realtime playback component 124, and a storage device, such as a personal computer (PC) hard drive 122. The realtime playback component 124 includes fine image alignment and adaptive convergence functionality. The computing device 120 is configured to process the 3D image data 158 and to provide an output signal 166 to the 3D display device 130.

During operation, an image is captured by a camera device within the camera phone 102. The captured image is detected by the image sensor pair 104 and first and second image data 150 corresponding to first and second images related to a scene is provided to the synchronization ASIC. The synchronization ASIC performs synchronization of operation of the sensor pair 104 and AE functionality, such as auto-exposure and white balancing type processing. Synchronized and processed data 152 from the synchronization ASIC is provided to the video front end component 108. The video front end component 108 performs the one or more image processing functions 110 and provides the processed data 154 to the 3D video encoding module 112. The 3D video encoding module 112 provides 3D video encoding and provides a video encoded output stream 156 including video encoded data which can be stored in the external memory 114. Data from the external memory 114 can be provided via an output connection and the 3D image data 158 can be output for delivery to the computing device 120.

The computing device 120, responsive to the 3D image data 158, stores the 3D image data at the PC hard drive 122. The 3D image data may be retrieved from the PC hard drive 122 and provided as input data 160 to the realtime playback component 124. The realtime playback component 124 performs fine image alignment and adaptive convergence processing to the input data 160. Adaptive convergence and image alignment processing produces further processed image data 162 which is provided to the in-house player 126. The in-house player 126 is responsive to user input to perform certain user requested commands. For example, the in-house player 126 is responsive to a zoom or pan command from a user. Responsive to the user command, the in-house player 126 provides a zoom/pan command 164 indicating zoom/pan control via a feedback path to the realtime playback component 124. The image alignment and adaptive convergence module 124, responsive to the zoom/pan command 164, performs adaptive convergence in response to a change in perceived scene depth resulting from the zoom or pan operation.

Thus, the computing device 120 includes a 3D media player configured to receive input data that includes at least a first image corresponding to a scene and second image corresponding to the scene. For example, the first image and the second image may be captured by the image sensor pair 104 and processed to generate 3D image data. The 3D media player is configured to provide output data to a 3D display device. For example, the realtime playback component 124 combined with the in-house player 126 may provide the output data 166 to the 3D display device 130. The 3D media player is responsive to user input including at least one of a zoom command and a pan command. For example, the realtime playback component 124 may perform adaptive convergence responsive to either a zoom command or a pan command 164 received via the zoom/pan control path. The 3D media player is configured to determine a convergence point of a 3D rendering of the scene responsive to the user input.

Figure 2:
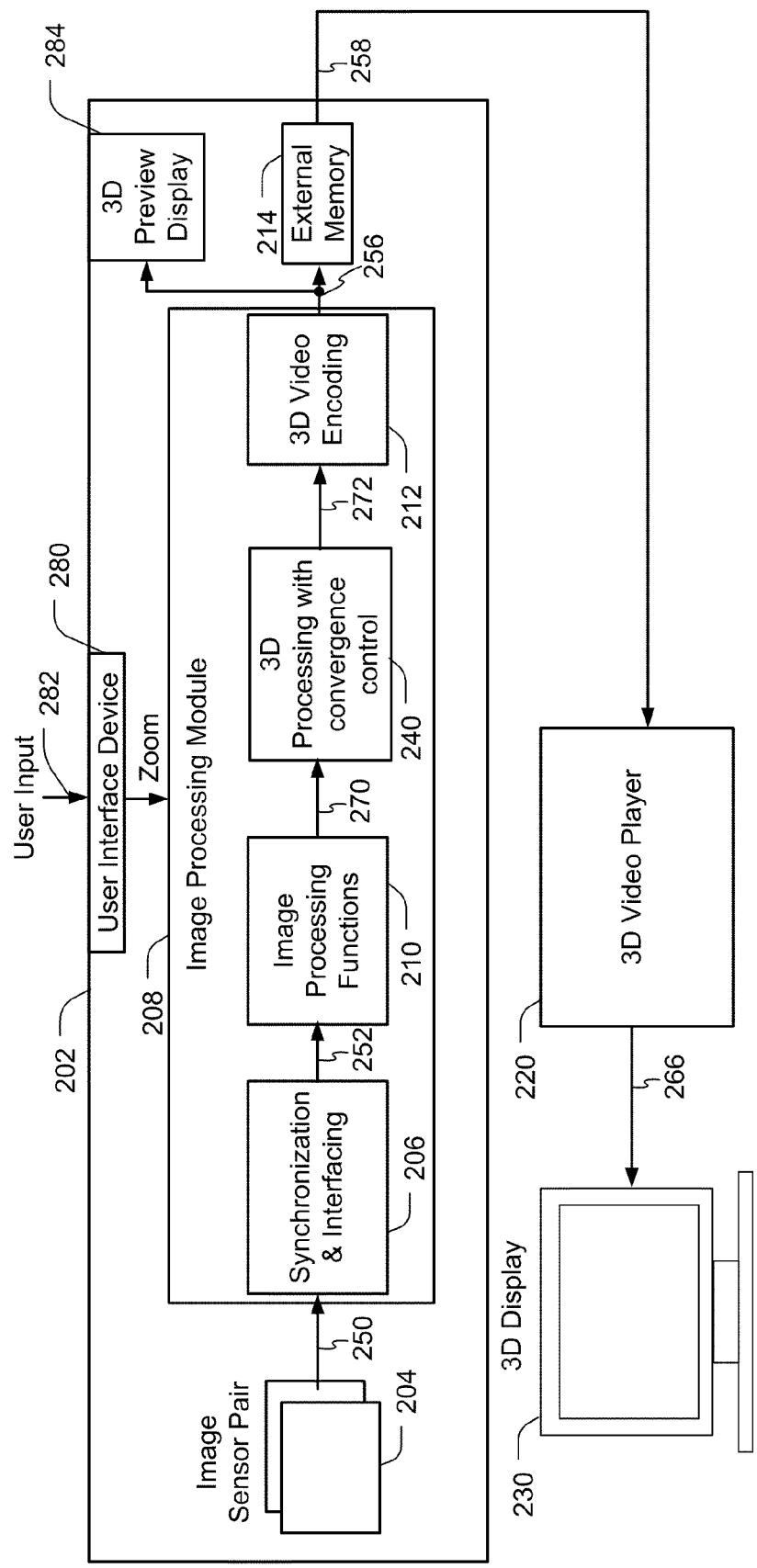
FIG. 2 is a block diagram of a particular embodiment of a system that includes a 3D capture device configured to perform adaptive convergence in response to a zoom instruction during image or video capture.

FIG. 2 is a diagram of a particular embodiment of a system that includes a 3D capture device 202 configured to perform adaptive convergence in response to a zoom instruction during image or video capture. The 3D capture device 202 includes an image sensor pair 204 coupled to an image processing module 208. A user interface device 280, an external memory 214, and a 3D preview display device 284 are coupled to the image processing module 208. A 3D video player 220 is illustrated as coupled to a 3D display device 230 to display 3D image data 258 provided by the image capture device 202.

The image sensor pair 204 is configured to provide image data 250 to the image processing module 208. For example, the image sensor pair 204 may include complementary metal-oxide-silicon (CMOS)-type image sensors or charge coupled device (CCD)-type image sensors. Each image sensor of the image sensor pair 204 may concurrently capture image data corresponding to a scene being captured by the 3D capture device 202. Image data 250 may be read out of the image sensor pair 204 and may be provided to the image processing module 208. In a particular embodiment, the image sensor pair 204 is set in a substantially parallel alignment and is not controllable to rotate or "toe in" during zoom operations.

The image processing module 208 may correspond to the synchronization ASIC and the video front end 108 of FIG. 1. The image processing module 208 may include a synchronization and interfacing module 206, an image processing functions module 210, a 3D processing with convergence control module 240, and a 3D video encoding module 212. The synchronization and interfacing module 206 may include circuitry to control synchronization of operation of the image sensor pair 204 and to control one or more other operating parameters of the image sensor pair 204.

The image processing functions module 210 may be configured to receive input data 252 and perform one or more image processing functions, such as color correction, color conversion, and noise reduction. For example, the image processing functions module 210 may be configured to perform the image processing functions 110 of FIG. 1 and to generate processed image data 270.

The 3D processing with convergence control module 240 may be configured to perform 3D-specific processing of a scene represented by the processed image data 270. The 3D processing with convergence control module 240 may be configured to perform convergence-point processing on a scene-by-scene basis.

For example, the 3D processing with convergence control module 240 may be configured to determine a convergence point of a 3D rendering of the scene. The 3D processing with convergence control module 240 may be configured to determine disparity values corresponding to objects within the scene and to determine the convergence point based on the disparity values of objects in the scene. The 3D processing with convergence control module 240 may be configured to determine whether the disparity values result in at least one of the objects not being fusable in the 3D rendering, and an alert may be generated at the user interface device 280 to inform a user of the device 202 that the scene is not fusable during 3D video capture of the scene.

The 3D processing with convergence control module 240 may be responsive to a predetermined display geometry. For example, the convergence-point processing may include adjusting a scene-based convergence point based on disparity values corresponding to objects in the scene and further based on the predetermined display geometry. The convergence-point processing on the scene-by-scene basis enables dynamic adjustment of the convergence point during a zoom operation performed by the first image sensor and the second image sensor of the image sensor pair 204 during 3D video capture.

For example, the predetermined display device geometry may correspond to the 3D video preview display device 284. Alternatively, or in addition, the predetermined device geometry may correspond to a "generic" or default device geometry that may be generally applicable to 3D video display devices. In a particular embodiment, multiple predetermined device geometries may be stored at the image capture device 202, and the predetermined display device geometry corresponds to a display geometry that is selected according to a user input. For example, the user interface device 280 may present a menu of selectable options that enable a user to select a first display geometry corresponding to a first display device (e.g. the 3D display device 230) when recording a first 3D movie and to select a different display geometry corresponding to another display device (not shown) when recording another 3D movie.

The 3D video encoding module 212 may be a 3D encoding module configured to generate 3D output data 256 based on an output 272 of the 3D processing with convergence control module 240. For example, when the output 272 corresponds to a still image, the 3D video encoding module 212 may be configured to encode the output 272 based on a Joint Photographic Experts Group (JPEG) encoding standard for 3D images. As another example, when the output 272 corresponds to video data, the 3D video encoding module may be configured to encode the output 272 based on a Moving Pictures Experts Group (MPEG) encoding standard for 3D images. The 3D video encoding module 212 may output 3D data 256 that may be provided to the 3D preview display device 284, the external memory 214, or to both.

The 3D preview display device 284 may display the 3D data 256 from the image processing module 208 to enable a user to view 3D scenes during image or video capture. For example, the image processing module 208 may generate reduced resolution video data for viewing by a user during video capture via the 3D preview display device 284.

By performing adaptive convergence control on a scene-by-scene basis, the image capture device 202 may enable zoom functionality during 3D video capture. For example, a user input 282 may be received via the user interface device 280 indicating a zoom command. As described in further detail with respect to FIGS. 10-14, a scene that may otherwise become unfusable in response to a zoom operation can be accommodated using adaptive convergence control. As a result, if the 3D video player 220 is not capable of processing 3D video to adjust a convergence point during playback, portions of 3D image data 258 that would otherwise be unfusable at the 3D display device 230 (e.g. due to zooming during image capture) may instead be fusable due to the processing performed at the image capture device 202.

Figure 3:
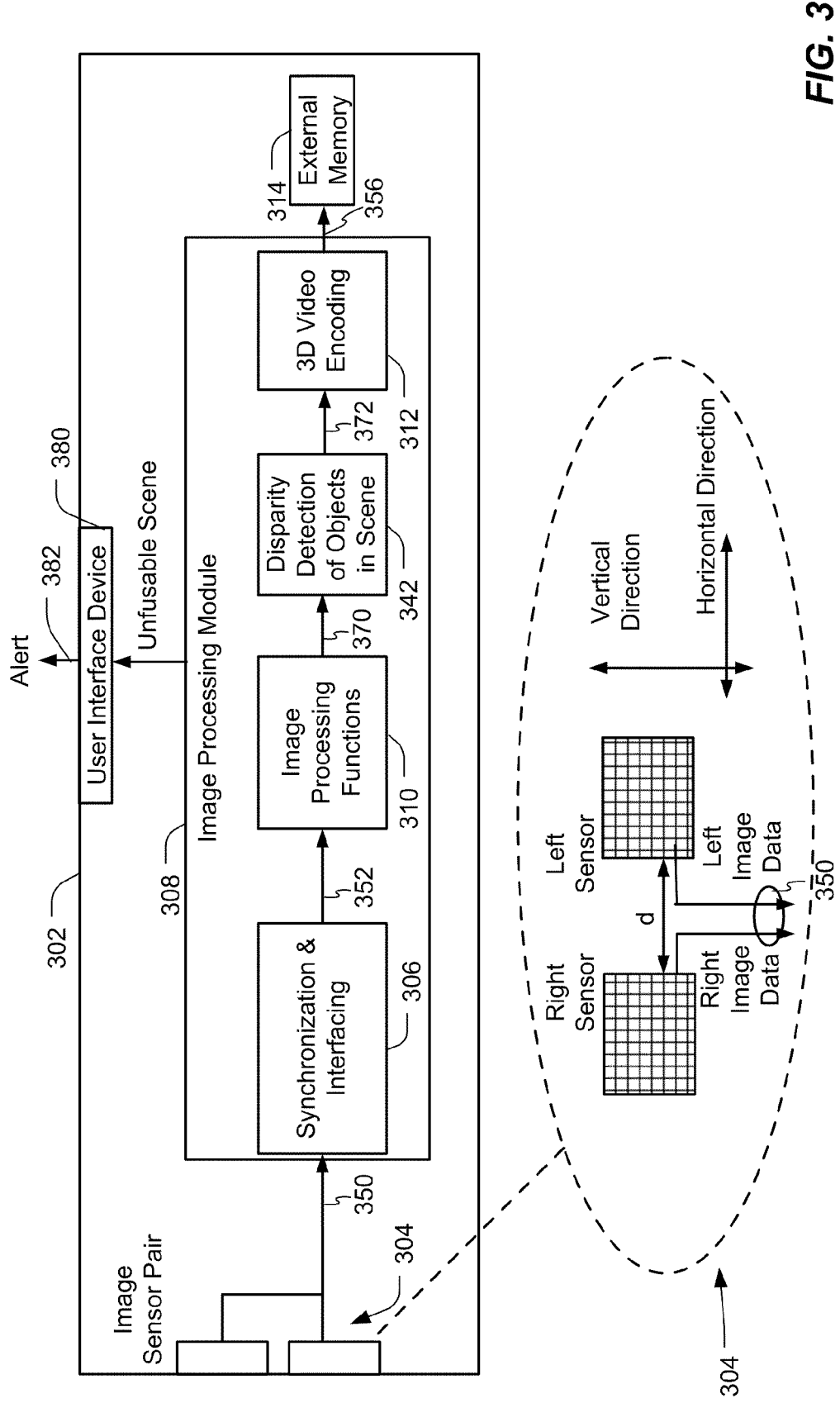
FIG. 3 is a diagram of a particular embodiment of a 3D capture device configured to detect disparity of objects in a scene during image or video capture.

FIG. 3 is a diagram of a particular embodiment of a 3D capture device 302 configured to detect disparity of objects in a scene during image or video capture. The 3D capture device 302 includes an image sensor pair 304 coupled to an image processing module 308. The image processing module 308 is coupled to a user interface device 380 and to an external memory 314. The image processing module 308 includes a synchronization and interfacing module 306, an image processing functions module 310, a disparity detection module 342, and a 3D video encoding module 312.

The image sensor pair 304 is configured to provide image data 350 to the image processing module 308. The synchronization and interfacing module 306 is configured to provide data 352 to the image processing functions module 310. The image processing functions module 310 is configured to provide processed image data 370 to the disparity detection module 342. The 3D video encoding module 312 is configured to receive 3D video data 372 and to generate encoded 3D video data 356. In a particular embodiment, the image sensor pair 304, the user interface device 380, the external memory 314, the synchronization and interfacing module 306, the image processing functions module 310, and the 3D video encoding module 312 correspond to the image sensor pair 204, the user interface device 280, the external memory 214, the synchronization and interfacing module 206, the image processing functions module 210, and the 3D video encoding module 212 of FIG. 2, respectively.

Figure 7:
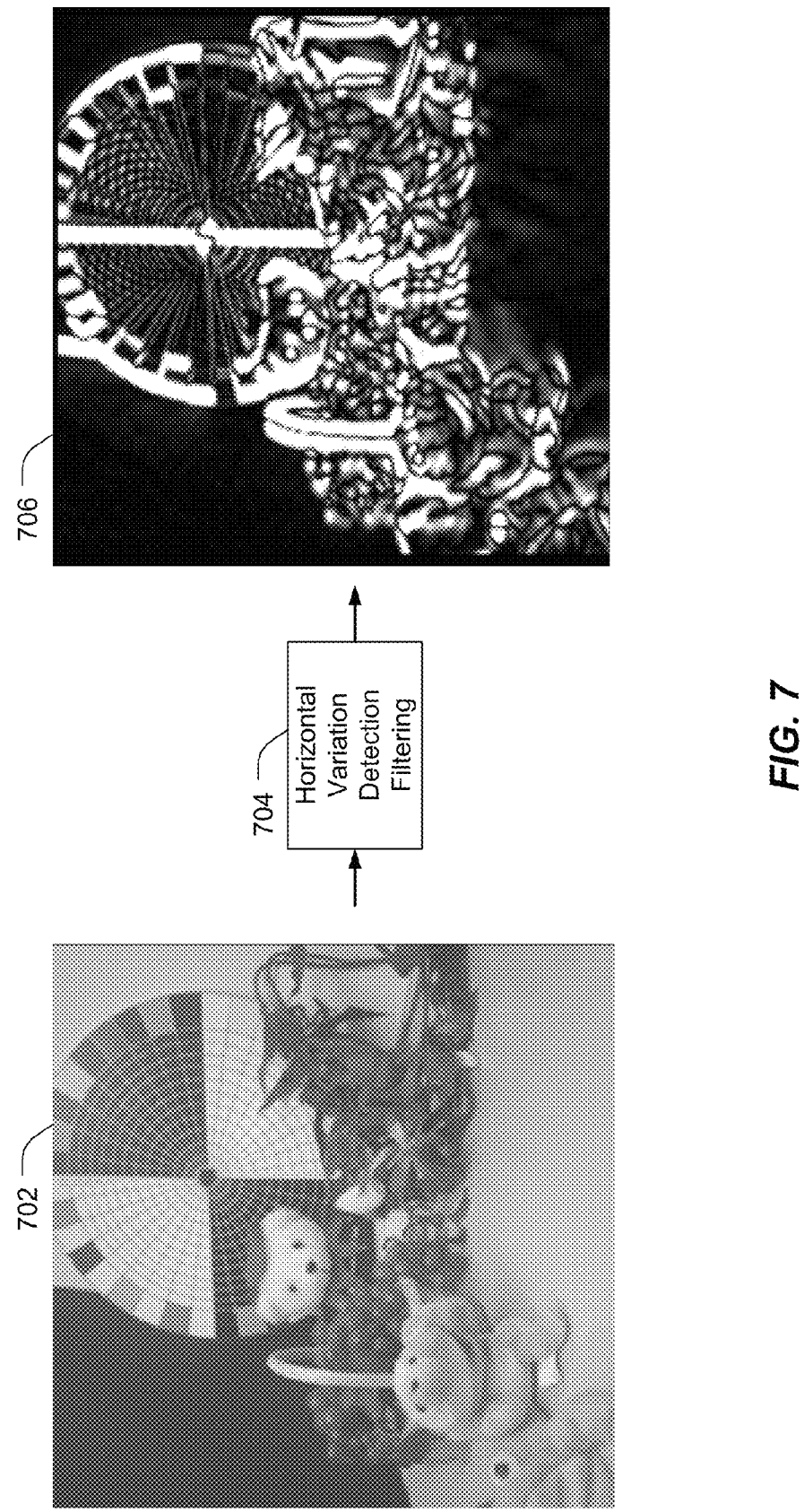
FIG. 7 is a diagram illustrating a particular embodiment of a subsampled luma component of a scene and a result of a horizontal variation detection filter applied to the subsampled luma component.
Figure 8B:
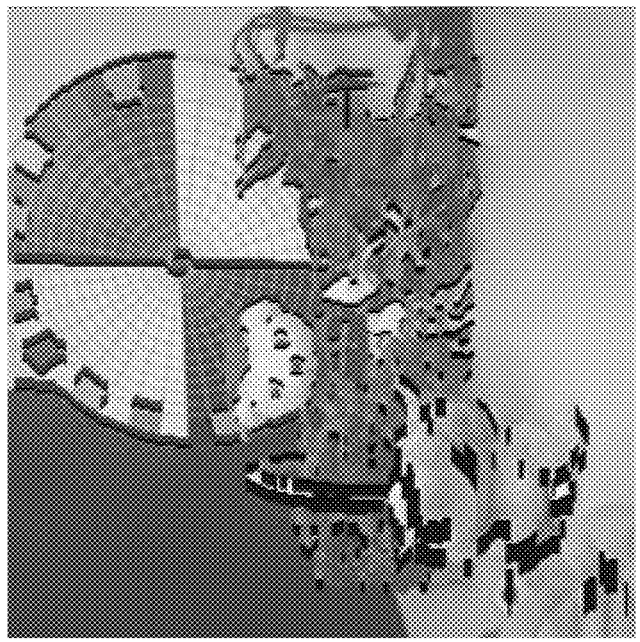
FIGS. 8A and 8B are diagrams of illustrative embodiments of local horizontal spatial maxima in the filtered result of FIG. 7 and neighborhoods of each local horizontal spatial maximum in the subsampled luma component of the scene of FIG. 7.
Figure 8A:
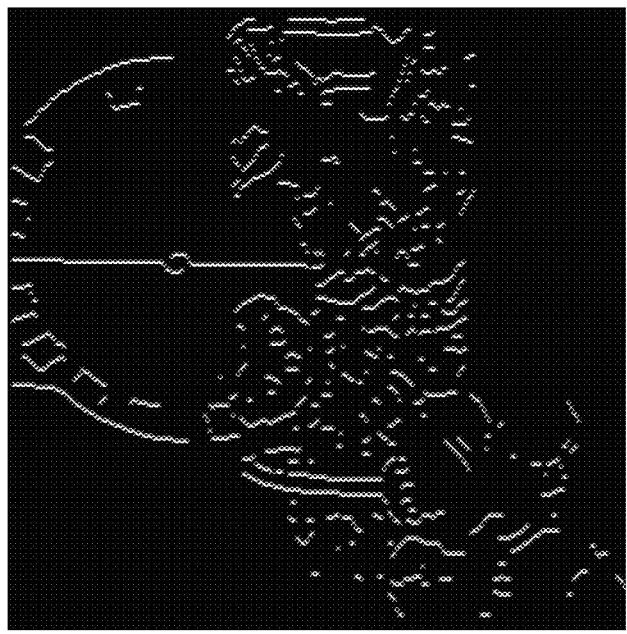
Figure 9:
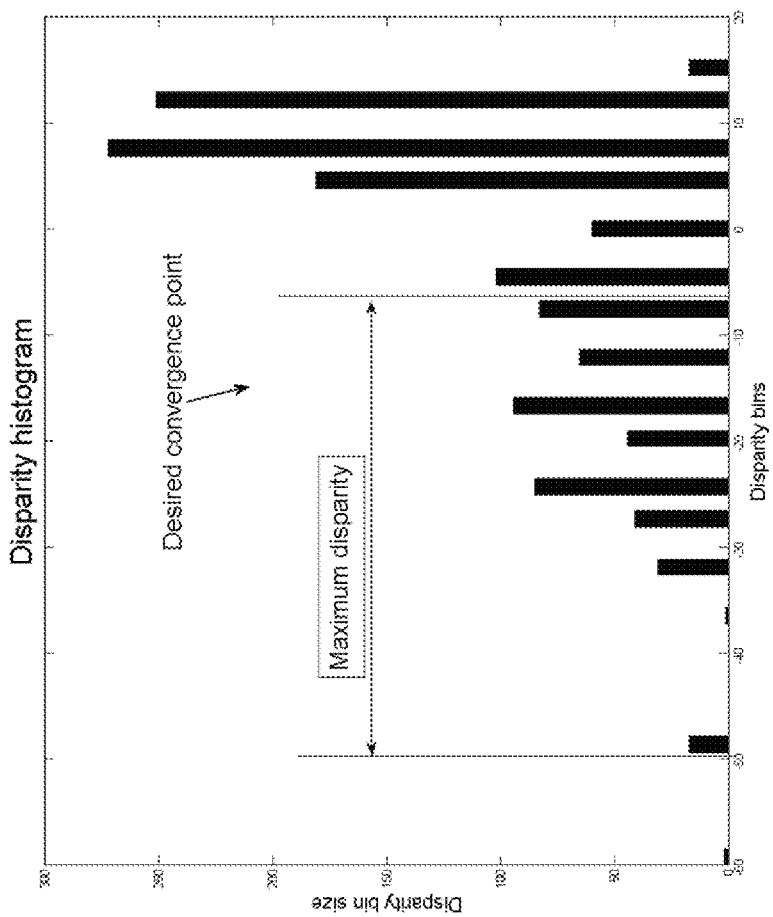
FIG. 9 is a histogram of a particular illustrative embodiment illustrating disparity of key points in a scene.

The disparity detection module 342 may be configured to determine disparity values corresponding to objects within a scene captured by the image sensor pair 304, such as described in further detail with respect to FIGS. 7-9. The disparity detection module 342 may be configured to determine whether the disparity values result in at least one of the objects not being fusable in a 3D rendering of the scene, and in this case, an alert 382 may be generated at the user interface device 380 to inform a user of the device 302 that the scene is not fusable during 3D video capture of the scene. In a particular embodiment, the disparity detection module 342 incorporates scene-specific object detection or key point detection and disparity determination functionality of the 3D processing with convergence control module 240 of FIG. 2, but is not configured to adjust a convergence point of the scene during video capture.

The image sensor pair 304 is illustrated in a representative view as a pair of sensors including a right sensor (i.e. a first sensor that captures the image that is associated with the scene perceived by a viewer's right eye) and a left sensor (i.e. a second sensor that captures the image that is associated with the scene perceived by a viewer's left eye). The image data 350 includes left image data generated by the left sensor and right image data generated by the right sensor. Each sensor is illustrated as having rows of photo-sensitive components extending in a horizontal direction and columns of photo-sensitive components extending in a vertical direction. The left sensor and the right sensor are substantially aligned at a distance d from each other along a horizontal direction. As used herein, a "horizontal" direction within 3D image data is a direction of displacement between a location of an object in the right image data and a location of the same object in the left image data.

Figure 4:
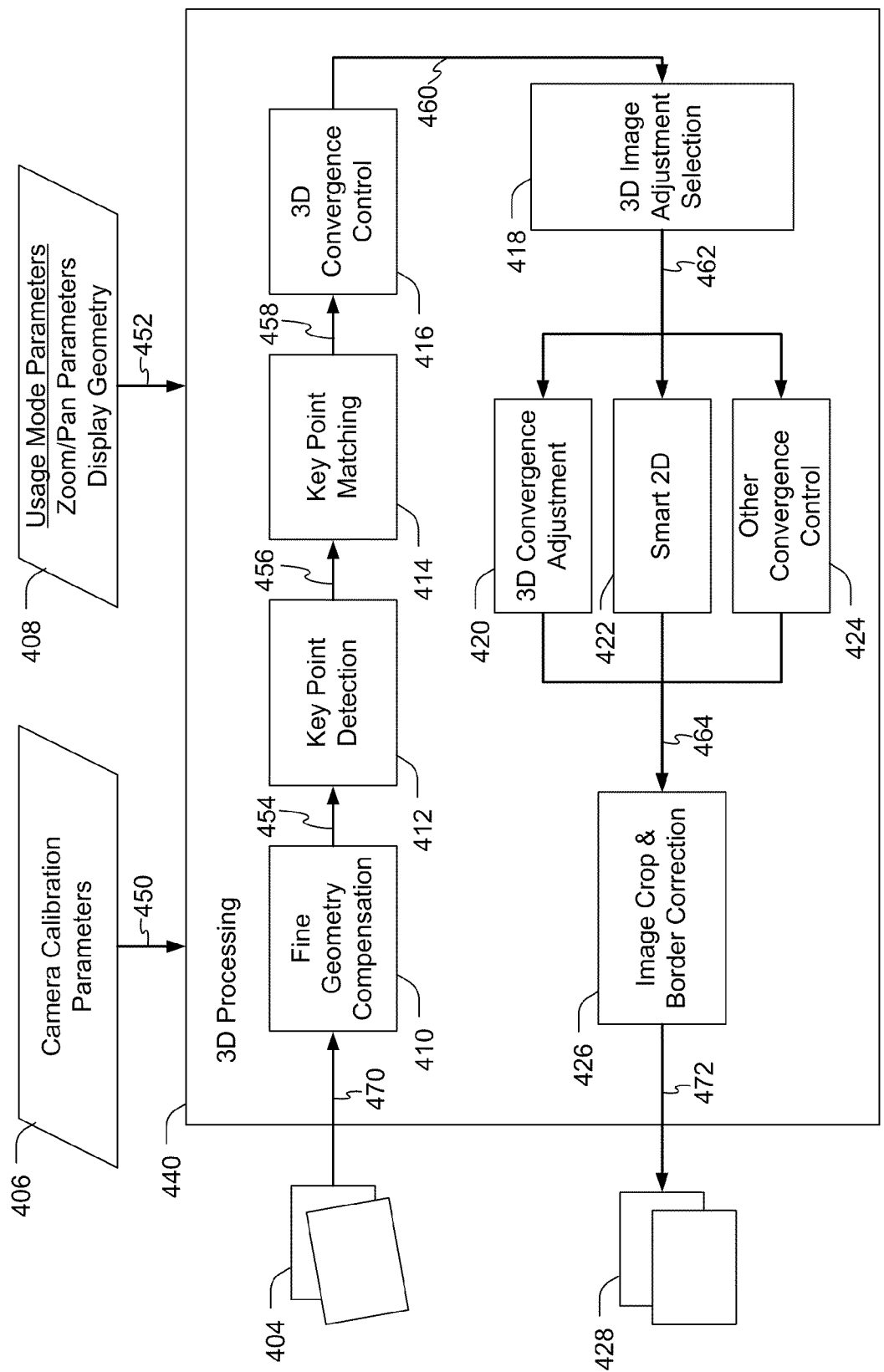
FIG. 4 is a block diagram of a particular embodiment of a 3D image processing system that can be included in any of the systems of FIGS. 1-3.

FIG. 4 is a diagram of a particular embodiment of a 3D image processing system 440 that can be included in any of the systems of FIGS. 1-3. The 3D processing system 440 is configured to receive input image data 404 and to generate output image data 428. The 3D processing system 440 may be responsive to camera calibration parameters 406 received via a calibration input 450 and usage mode parameters 408 received via a usage mode input 452.

The 3D processing system 440 includes a fine geometry compensation module 410, a key point detection module 412, a key point matching module 414, a 3D convergence control module 416, a 3D image adjustment module 418, one or more of a smart 3D convergence module 420, a smart two-dimensional (2D) module 422, and another convergence control module 424. The 3D processing system 440 may also includes an image crop and border correction module 426. In a particular embodiment, the 3D processing system 440 may be implemented by a graphics processing unit (GPU) executing program instructions configured to cause the GPU to process the input image data 404 in a manner as described for one or more of the modules 410-426.

The geometry compensation module 410 is configured to receive the input image data 404 via a data path 470 and to generate compensated image data 454. The geometry compensation module 410 may use data from the camera calibration parameters 406 and may adjust the input image data 404 to correct for misalignment, aberration, or other calibration conditions that may adversely impact rendering of the 3D image data 404. To illustrate, the geometry compensation module 410 may effectively perform a resampling of the image data 404 on an arbitrary grid to adjust for the calibration parameters 406.

In an embodiment where the 3D processing system 440 is implemented in a 3D video playback device, such as the computing device 120 of FIG. 1, the camera calibration parameters 406 may be received with the input image data 404, such as in a header of a 3D video data file. In an embodiment where the 3D processing system 440 is implemented in a 3D image capture device, such as the image capture devices 102 of FIG. 1, 202 of FIG. 2, or 302 of FIG. 3, the camera calibration parameters 406 may correspond to an image sensor pair of the image capture device and may be stored in a memory accessible to the fine geometry compensation module 410.

The key point detection module 412 is configured to receive the compensated image data 454 and to generate key point location data 456. The key point detection module 412 is configured to identify distinctive points in the compensated image data 454. For example, the distinctive points may correspond to vertical edges of objects in a scene or other points of the scene having a high-frequency component in the horizontal direction. Although such distinctive elements in the image data are referred to herein as "key points" or "objects" it should be understood that such identified elements may correspond to individual pixels, groups of pixels, fractional pixel portions, other image components, or any combination thereof. For example, as described further with respect to FIGS. 7A-7B, the key points may correspond to pixels with a subsampled luma component of received image data and may be detected using a vertical edge detection filter.

The key point matching module 414 is configured to receive the key point location data 454 and to generate disparity data 458 corresponding to the identified key points. The key point matching module 414 may be configured to search around the key points within a search range and produce reliability measures of disparity vectors.

The 3D convergence control module 416 is configured to receive the disparity data 458 and to generate data 460 indicating a convergence point. For example, the 3D convergence control module 416 may extract the convergence point based on display geometry, zoom operations, pan operations, other display factors, or any combination thereof. The 3D convergence control module 416 may also control convergence loops. For example, the 3D convergence control module 416 may implement a filter, such as an infinite impulse response (IIR) filter, to slowly vary a convergence point based on a history of scenes to smooth scene changes and prevent large jumps in disparity from scene to scene. However, when an indication of a zoom or pan operation is received via the usage mode input 452, the 3D convergence control module 416 may initiate a state reset of the filter to enable large variations of disparity to accommodate the zoom or pan operation.

The 3D image adjustment module 418 is configured to receive the data 460 indicating the convergence point and to selectively direct image processing to the 3D convergence adjustment module 420, to the smart 3D module 422, or to the other convergence control module 424. For example, when a range of disparity of key points in the scene is within a predetermined range, the key points of the scene are fusable and the convergence point may be adjusted at the convergence adjustment module 420 by shifting at least one of the first image and the second image relative to the other of the first image and the second image.

As another example, when the range of disparity of the key points exceeds the predetermined range, processing may be performed at the smart 3D module 422. The smart 3D module 422 may be configured to replace one of the first image and the second image with a shifted version of the other of the first image and the second image. A shift amount may be determined based on an average disparity or median disparity of the identified key points. A resulting scene may appear as a flat scene (i.e. with no perceived depth between objects in the scene) with all objects perceived at a depth appropriate for at least some objects in the scene.

Alternatively, when the range of disparity of the key points exceeds the predetermined range, processing may be performed at the other convergence module 424. For example, the other convergence module 424 may be configured to adjust the image data by using one or more invasive techniques, such as by identifying an object in the scene that is not fusable and altering at least one of the first image and the second image to reposition the object to be fusable.

The image crop and border correction module 426 may be configured to receive fusable 3D image data 464 and to generate the output 3D data 428. The image crop and border correction module 426 may be configured to perform one or more image crop operations of the fusable 3D image data 464. The image crop and border correction module 426 may further be configured to perform border correction to the fusable 3D image data 464.

During operation, a scene-dependent adaptive convergence process is performed that includes fine geometry compensation of the 3D image data 404 (e.g. by the fine geometry compensation module 410). A calibration procedure designed to estimate and compensate the relative position between the two sensors that captured the 3D image data 404 may be performed off-line (e.g. prior to delivery to an end-user of the device) but the geometry compensation may be performed for every frame of the 3D image data 404.

Processing continues with key point detection (e.g. at the key point detection module 412). A set of objects or pixels (key points) of the image are selected that can be used to reliably estimate disparities. A high confidence in the estimated disparity may be achieved, and not all regions or objects in the scene may be used. Selection of the set of key points may include image sub-sampling to produce appropriate resolution(s). An image high pass filter may be applied (e.g. only looking for horizontal frequencies, corresponding to vertical features), followed by taking a square or absolute value of a result generated by applying the filter. Results exceeding a predetermined threshold may be identified as potential key points. A key points pruning process may be performed to the potential key points to select the best key point within some local neighborhood (e.g. the key point corresponding to a largest filter result of all key points within a predetermined region).

Key point matching may be performed using the detected key points (e.g. at the key point matching module 414). Correspondence between a key point in a first image (e.g. the left image or the right image) and the corresponding area in a second image (e.g. the other of the left image and the right image) may be determined. A reliability estimator may be produced, which together with key point selection may improve significantly the disparity estimation accuracy. Matching may be performed using a normalized cross-covariance to enable determination of how close the match is between the key points in the left image and the right image. A reliability measure may be based on the normalized cross-covariance. In a particular embodiment, a search range for locating a key point in a second image that corresponds to a key point in the first image is only horizontal because image compensation for sensor calibration has already been performed, and the search range is adjusted to only cover a certain range around the convergence point, which may be determined at the fine geometry compensation module 410.

3D convergence control (e.g. at the 3D convergence control module 416) may be performed after the set of key points in the first image are matched to a set of corresponding key points in the second image. Based on sufficient statistics, such as disparity histogram screen geometry and crop window size, a decision can be made whether the scene can be rendered in 3D. If the scene can be rendered in 3D, then a horizontal shift is applied (e.g. via the 3D convergence adjustment 420). If the scene cannot be rendered in 3D, one or more of several possible fallbacks may be used, such as smart 2D processing, 2D to 3D processing, or invasive convergence control processing, as particular examples.

To determine whether the scene can be rendered in 3D, a histogram may be generated of disparity values for each key point of the selected set of key points. One or both tails of the histogram may be cropped. For example, when some of the disparity values are expected to be erroneous, reliability of determining whether the scene is fusable (i.e. all key point disparity values that are examined fall within a predetermined range of disparity values) may be improved by removing one or more of the largest disparity values or the smallest disparity values from the set of key points disparity values that are considered. The disparity range of the scene is then specified by the min/max of the histogram.

In a particular embodiment, at least a portion of the 3D image processing system 440 may be implemented in one or more of the systems of FIGS. 1-3. For example, the 3D image processing system 440 may be implemented in the fine image alignment and adaptive convergence module 124 of FIG. 1. As another example, the 3D image processing system 440 may be implemented within the 3D processing with convergence control module 240 of FIG. 2. As another example, the modules 410-416 of the 3D image processing system 440 may be implemented in the disparity detection module 342 of FIG. 3.

Although FIGS. 1-4 describe pairs of image sensors used for 3D capture, in other embodiments more than two image sensors may be used. In some embodiments one or more of the various modules and components described in FIGS. 1-4 may be implemented as dedicated hardware (i.e. circuitry), as a processor that executes processor executable instructions that are stored at a non-transient storage medium, such as an erasable programmable read-only memory (PROM)-type storage, a flash memory, a read-only memory (ROM) memory, or as a combination of hardware and instructions executing at a processing device (e.g. at a controller, a general-purpose processor, a digital signal processor (DSP), a graphics processing unit (GPU), or any combination thereof).

Figure 5:
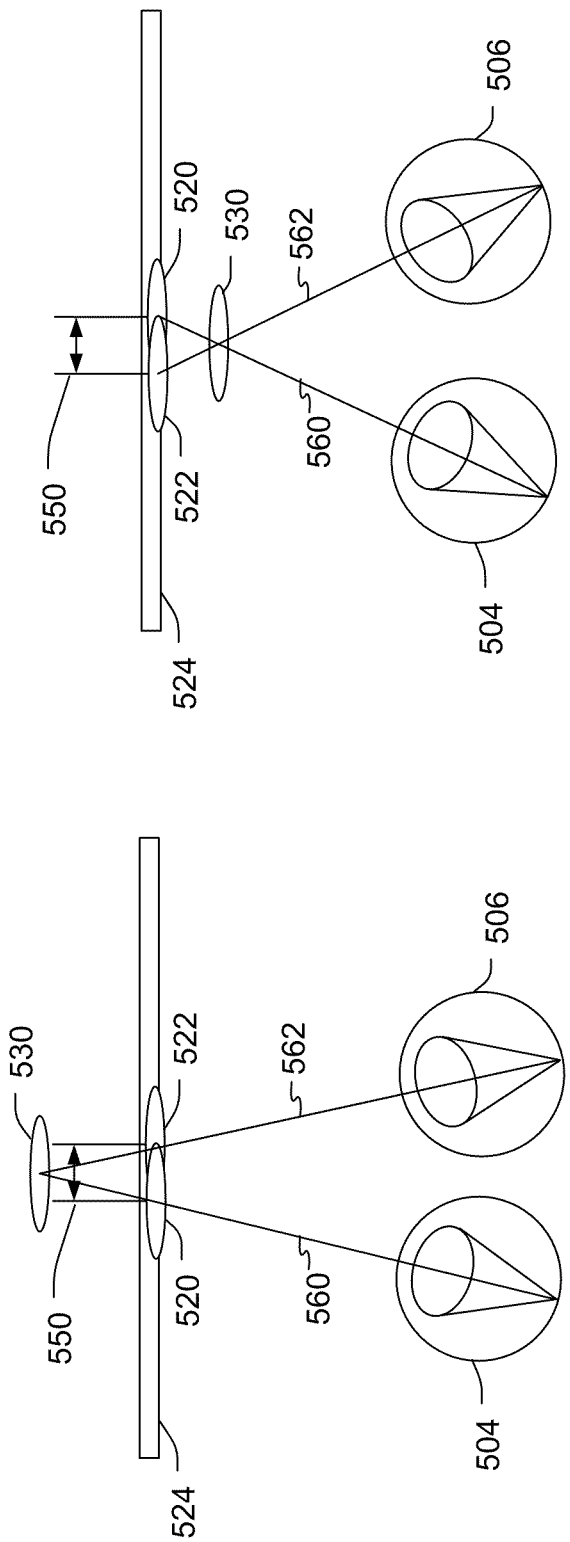
FIGS. 5A and 5B are diagrams of illustrative embodiments of object disparities correlated with perceived object depths.

FIGS. 5A and 5B are diagrams of illustrative embodiments of object disparities correlated with perceived object depths. Stereo 3D display relies on directing different images to each eye 504, 506. The purpose is to recreate depth illusion from left and right (L/R) images, as object disparities (horizontal shift) are correlated with depths. FIG. 5A shows a positive disparity 550 corresponding to an object 530 perceived past a display surface 524. The disparity 550 indicates a distance between a location 520 of the object in a left image and a location 522 of the object in a right image. An observer will fuse the image of the object 530 in the left image and the image of the object 530 in the right image to perceive the object 530 at an intersection of a line of sight 560 of the left eye 504 and a line of sight 562 of the right eye 506.

FIG. 5B shows a negative disparity 550 corresponding to the object 530 perceived in front of the display surface 524. The disparity 550 indicates a distance between a location 520 of the object in a left image and a location 522 of the object in a right image. An observer will fuse the image of the object 530 in the left image and the image of the object 530 in the right image to perceive the object 530 in front of the display surface 534 at an intersection of the line of sight 560 of the left eye 504 and the line of sight 562 of the right eye 506.

Object displacement as seen from the two eyes is interpreted by the visual cortex as depth. The visual cortex can interpret as depth up to a certain displacement. There is a range, [−d1 ... d2], in which image fusion can happen without an eye strain. Disparity between two captured images will depend on the scene. Sensing the scene depth (or disparity range) allows for adjusting the disparity to fit in the fusable range [−d1 ... d2]. Disparity can be adjusted by changing the convergence point, such as by shifting horizontally one of the images relative to the other.

The convergence point can be controlled by shifting horizontally the crop windows in the left and right images. The convergence point may be scene dependent in order to fully utilize the available z-range on the screen (i.e. depth range available at the display surface of the 3D display device 130 of FIG. 1).

A design for adaptive convergence control can include scene range estimation and convergence control. Scene range estimation can be used for the convergence point control and possibly invasive disparity control. Convergence control may contain the logic that controls all the disparity in the image.

Figure 6:
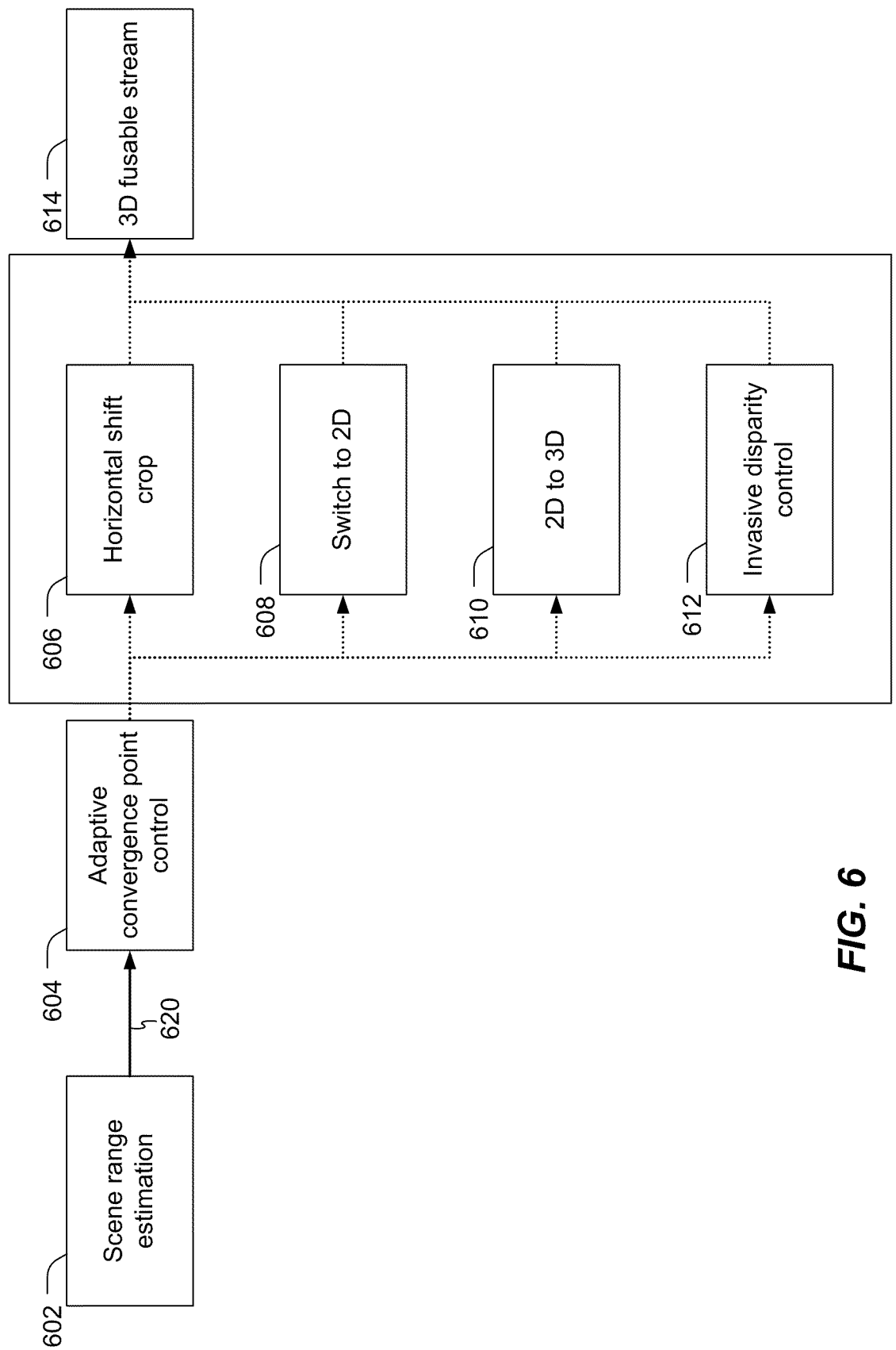
FIG. 6 is a block diagram of a particular embodiment of a 3D image processing system that can be included in any of the systems of FIGS. 1-3.

FIG. 6 is a diagram of a particular embodiment of a 3D image processing system that can be included in any of the systems of FIGS. 1-3. A scene range estimation module 602 provides scene range data 620 to an adaptive convergence point control module 604. After adaptive convergence point control processing, image data may be processed by a horizontal shift crop module 606, a switch to 2D module 608, a 2D to 3D module 610, or an invasive disparity control module 612. The processed image data may be included into a 3D fusable stream of image data 614.

Scene range estimation performed by the scene range estimation module 602 may be generalized as sparse motion vectors estimation between the left and right images. The scene range estimation process can include key (distinctive) point identification. Vertical variations are not needed since only horizontal shift is present (and will be measured). Horizontal variations (edges with some vertical component) are used. In some embodiments key points may be detected at different resolutions. The scene range estimation process can also include key point matching. Key point matching may be performed using normalized cross-covariance in order to be light-level independent and to produce a robust disparity reliability metric. As a result, matching key points with different resolutions may be unnecessary.

FIG. 7 is a diagram illustrating a particular embodiment of a subsampled luma component of a scene 702 and a result 706 of a horizontal variation detection filtering 704 applied to the subsampled luma component. The luma component of the scene may be subsampled by four, as an illustrative example. The horizontal edge detection filtering 706 may pass through a filter with a response h given by:

$$h = \begin{bmatrix} 1 & 1 & 1 & 1 & 1 & -1 & -1 & -1 & -1 & -1 \\ 1 & 1 & 1 & 1 & 1 & -1 & -1 & -1 & -1 & -1 \\ 1 & 1 & 1 & 1 & 1 & -1 & -1 & -1 & -1 & -1 \end{bmatrix}$$

An absolute value of a result may be taken to generate the result 706.

FIGS. 8A and 8B are diagrams of illustrative embodiments of local horizontal spatial maxima in the filtered result 706 of FIG. 7 and neighborhoods of each local horizontal spatial maximum in the subsampled luma component of the scene of FIG. 7. Using the filtered result 706 of FIG. 7, a highest value in each horizontal neighborhood of potential key points in the filtered result 706 (local horizontal spatial maximum) may be selected to generate selected key points illustrated in FIG. 8A.

For every selected key point, a neighborhood may be selected around the key point from the left luma image (shown in FIG. 8B), a correlation coefficient with the right image neighborhood may be computed (with a search range), and if correlation confident above a certain threshold, keep the motion vector (i.e. treat the key point as having a reliable disparity).

Convergence control (e.g. by the convergence control point module 604 of FIG. 6) may be performed by building a histogram of motion vectors. FIG. 9 depicts a histogram of a particular illustrative embodiment of disparity of key points in a scene. Disparity values (in bins of one or more disparity values) are depicted along a horizontal axis and a number of the selected key points having a disparity value corresponding to each bin is illustrated along the vertical axis. A maximum disparity range and desired convergence point are also illustrated in the histogram. Although FIG. 9 depicts a histogram in a graphical form for clarity of explanation, implementations of the process may not include generating a graphical form of a disparity histogram and instead a data structure such as a table, list, array or other structure may be used to relate disparity values with a count of key points corresponding to the disparity values.

After building the histogram, the tails of the histogram may be trimmed. Scene range may be estimated as a difference between minimum and maximum values in the histogram (e.g. a difference between a largest disparity bin in the histogram that has a non-zero size and a smallest disparity bin in the histogram that has a non-zero size). An average between the minimum value and the maximum value, or some other linear combination, will be the desired zero disparity point (convergence point). The maximum remaining disparity determines if the scene is fusable or not. If the scene is not fusable, options include switching to a 2D stream (make left and right frames the same), performing a 2D to 3D conversion, or invasive disparity control processing, as illustrative examples.

Disparity (left and right) image shift plays a role in 3D effects and can produce discomfort/headache if not handled correctly. Display dimension and viewing distance affect disparity and can produce undesired effects if not compensated for. Zoom functionality can be an attribute to a 3D suite and also affects the disparity (in real time).

Disparity constraints may be configured based on user preferences. Scene-dependent disparity constraints can be derived in real time based on display size and distance and zoom factor. Scene disparity can be measured and if the scene disparity is within the constraints, a convergence point of the scene may be adjusted. If the scene disparity is not within constrains, processing may switch to a special mode to bring disparity within the constraints.

Special processing (3D effect control) may be used depending on one or more of: display viewing angle, display size, distance between viewer and display, and zoom factor. Consideration may be made to fully use an available range and to produce a 3D effect that is comfortable to the user.

Humans can only interpret (fuse) up to a certain angular disparity, after that ghosting appears (double images). An object's perceived depth may be solely dependent on the angular disparity. Angular disparity depends on a combination of screen size, screen resolution, and viewing distance.

Figure 10:
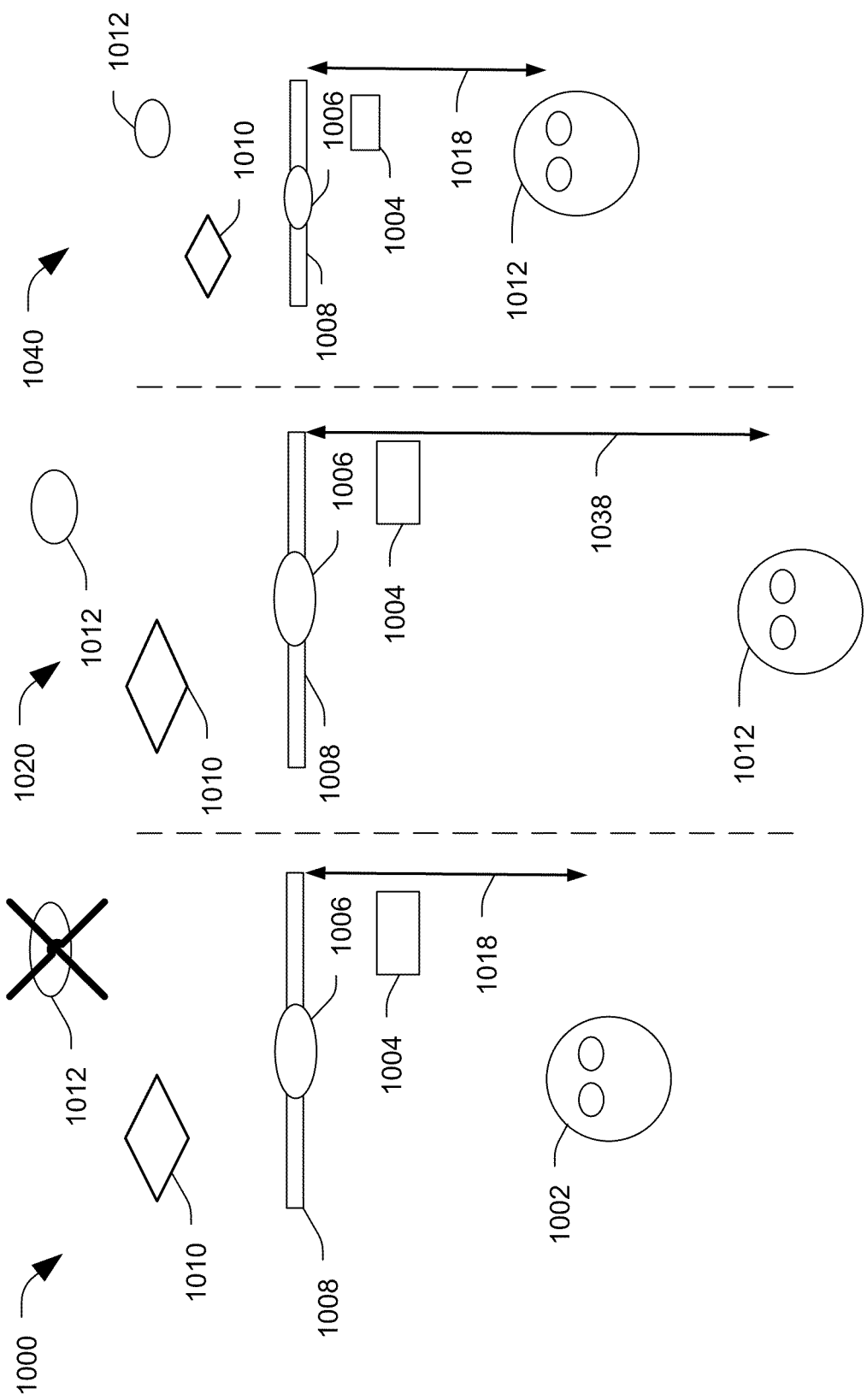
FIG. 10 is a diagram of a particular embodiment depicting effects of viewing distance on 3D perception of a scene.

FIG. 10 is a diagram of a particular embodiment of effects of viewing distance on 3D perception of a scene. A first configuration 1000 has a viewer 1002 a first distance 1018 from a screen 1008. A first object 1004 is perceived in front of the scene (i.e. has negative disparity), a second object 1006 is perceived at the screen 1008 (i.e. has zero disparity), a third object 1010 is perceived beyond the screen 1008 (i.e. has positive disparity) and a fourth object 1012 is not fusable due to too large of a disparity.

In a second configuration 1020 a viewing distance 1038 is increased and all objects 1004, 1006, 1010, and 1012 are fused. However, a depth contrast is reduced. In a third configuration 1040 the viewing distance 1018 matches the first configuration 1000 and a size of the viewing screen 1008 has decreased. All objects 1004, 1006, 1010, and 1012 are fused but a depth contrast is reduced.

FIG. 11 is a diagram of illustrative embodiments of disparity dependency on display viewing distance. A first configuration 1102 illustrates an allowed scene depth range 1110 extending from in front of a screen 1108 to behind the screen 1108. A first position 1116 indicates a largest allowed cross-before-screen disparity and a second position 1114 indicates a largest cross-after-screen disparity. A second configuration 1104 illustrates a smaller viewing distance between the screen 1108 and an observer than the first configuration 1102. The range 1110 of allowed scene depth does not extend as far in front of the screen 1108 as in the first configuration 1102.

Cross-after-screen disparity on the screen 1108 may not be greater than the eye distance (i.e. the distance between the observer's eyes). This consideration leaves less angular shift in that direction for screens on greater distance. As illustrated in the second configuration 1104, closer screens do not allow large cross-before-screen disparity due to eye strain. A particular solution based on such considerations includes allowing more 3D depth effect for closer screens and more 3D pop out effect for farther screens.

Figure 12:
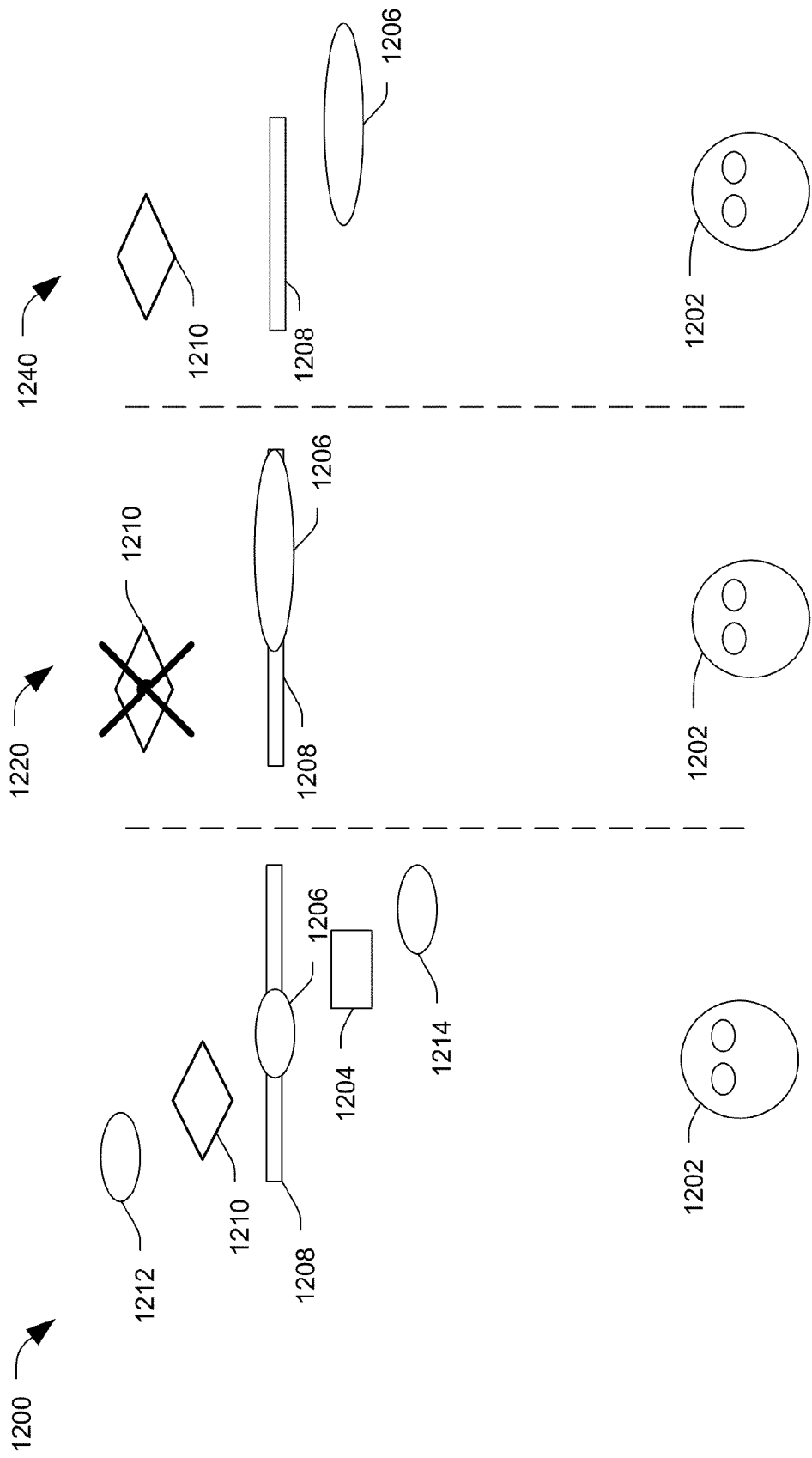
FIG. 12 is a diagram of a particular embodiment depicting effects of a zoom operation on 3D perception of a scene.

FIG. 12 is a diagram of a particular embodiment of effects of a zoom operation on a 3D perception of a scene. A first configuration 1200 includes a viewer 1202 perceiving a scene that includes a set of objects, including a first object 1214 and a second object 1204 in front of a screen 1208, a third object 1206 at the screen 1208, and a fourth object 1210 and a fifth object 1212 past the screen 1208.

A second configuration 1220 includes a zoomed image of the same scene as the first configuration 1200. Only the third object 1206 and the fourth object 1210 appear in the scene due to the zoom. The fourth object 1210 is not fusable.

A third configuration 1240 includes a zoomed image of the same scene as the first configuration 1200 with appropriate zoom control. In contrast to the second configuration 1220, both the third object 1206 and the fourth object 1210 are fusable. The disparity of the fourth object 1210 is reduced to within a fusable range by shifting the convergence point of the scene between the objects 1206 and 1210 so that the third object 1206 appears before the screen 1208 and the fourth object 1210 appears past the screen 1208.

For display and zoom dependent 3D effect control, an allowable disparity may be set at a value $\alpha=0.5°-2°$ (e.g. specified during configuration time). $\theta_{display}$ is a viewing angle, D is a scene depth, i.e., the difference between maximum (D2) and minimum (D1) disparity vectors, expressed in numbers of pixels. W is an image width in pixels, x is a distance from the screen. Two questions that may be addressed are whether the scene depth range is fusable and where the convergence point should be placed.

Angular disparity (°) that will be seen on screen is given by $(D/W)*\theta_{display}$. Disparity may be tested and determined to be fusable when $\alpha>(D/W)*\theta_{display}$. If the disparity is fusable, the convergence point may be adjusted. Using the notation D1 for cross-before-screen disparity and D2 for cross-after-screen disparity, the convergence point may be selected as $C=D1+D*M(X)$, where X is distance from screen and M( ) is a monotonically increasing function between 0 and 1.

Figure 13:
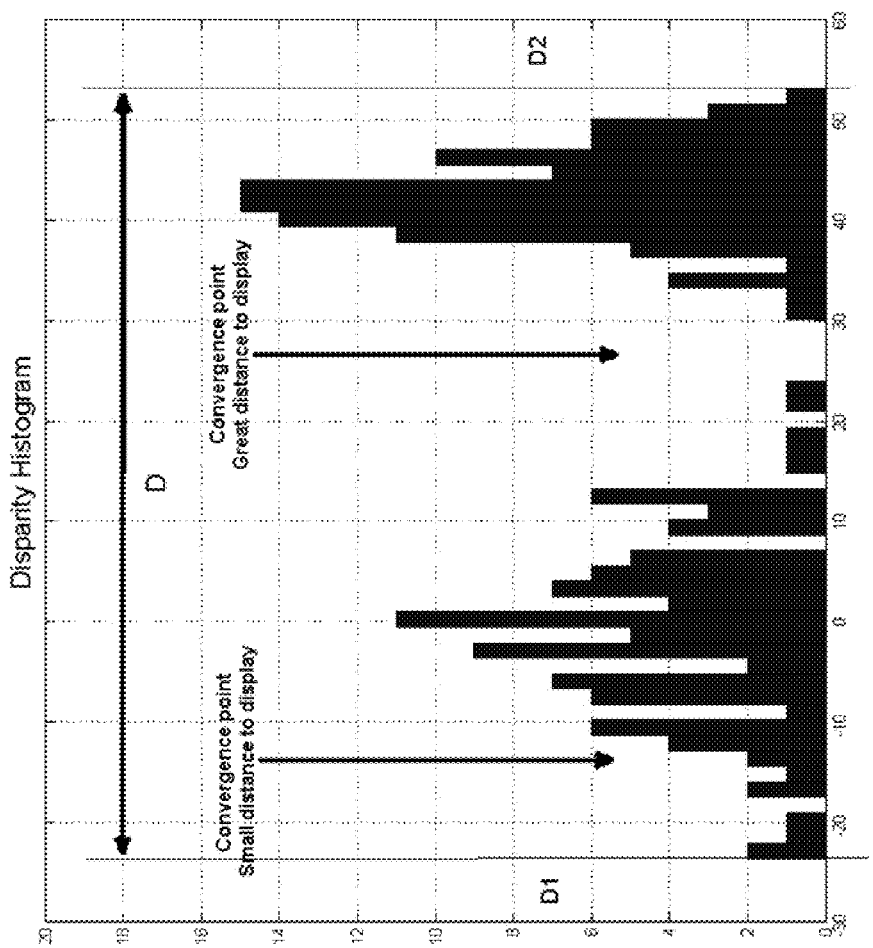
FIG. 13 is a histogram of a particular illustrative embodiment depicting scene disparity and convergence point selection.
Figure 14:
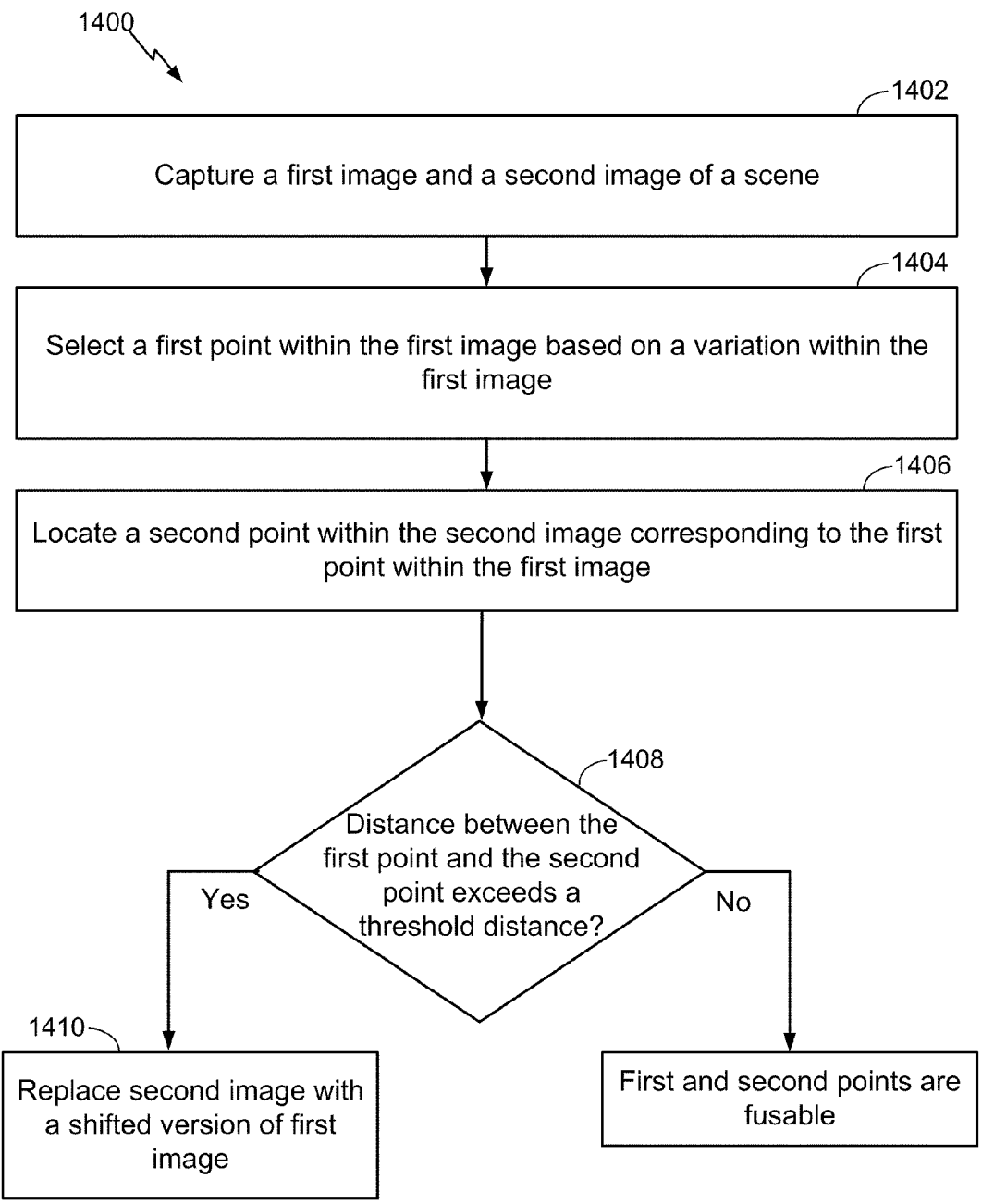
FIG. 14 is a flow diagram of a first embodiment of a method of 3D image processing.

FIG. 13 is a histogram of a particular illustrative embodiment of scene disparity and convergence point selection. When a distance (X) between a viewer and the display is small, the convergence point is set so that few objects appear in front of the screen. In contrast, when the distance (X) is larger, the convergence point is set so that more of the objects appear in front of the screen.

In conjunction with the systems and processes illustrated in FIGS. 1-13, adaptive 3D convergence is enabled during video capture, during playback, or both. For example, in a particular embodiment, a method 1400 illustrated in FIG. 14 may be performed at a 3D image capture device such as the devices 102, 202, and 302 of FIGS. 1-3, respectively. Alternatively or in addition, the method may be performed at a 3D playback device such as the device 120 of FIG. 1 or at another device that includes one or more of the components 410-426 of FIG. 4 or one or more of the components 602-614 of FIG. 6.

The method may be performed using a first image and a second image that correspond to a single scene. The first image may correspond to a first image capture of the scene by a first sensor and the second image may correspond to a second image capture of the scene by a second sensor, where the second image capture is substantially concurrent with the first image capture, such as by one of the sensor pairs depicted in FIGS. 1-3, at 1402.

A first point may be selected within a first image based on a variation within image data corresponding to the first image, at 1404. To illustrate, the first point may be a key point or object that is selected as described with respect to the key point detection module 412 of FIG. 4. A second point may be located within a second image, at 1406. The second point may correspond to the first point. To illustrate, the second point may be located as described with respect to the key point matching module 414 of FIG. 4.

A determination may be made whether a distance between the first point and the second point exceeds a threshold distance to be perceptible as a single point of a three-dimensional (3D) rendering of the scene, at 1408. For example, the distance between the first point and the second point can correspond to a key point or object disparity and may be unfusable when the disparity exceeds a threshold (e.g. is less than D1 or is greater than D2 of FIG. 13) or is outside an allowable range (e.g. a range according to the range 1110 of FIG. 11). To illustrate, the determination may be performed by the 3D convergence control module 416 of FIG. 4. In response to the distance between the first point and the second point exceeding the threshold distance, the second image may be replaced with a shifted version of the first image, at 1410. Otherwise, when the distance between the first point and the second point is not greater than the threshold distance, the first point and the second point are fusable.

For example, the variation may be identified by applying an edge detection filter to image data corresponding to the first image and locating a largest absolute value that results from applying the edge detection filter within a horizontal region of the first image, where the first image corresponds to a left image and the second image corresponds to a right image of the 3D rendering. As an example, the filter can be the filter used for horizontal variation detection filtering 704 of FIG. 7 to locate edges having at least some vertical component. The image data may include subsampled luma data corresponding to the first image, as described with respect to FIG. 7. A horizontal direction may correspond to a direction between a first image capture device corresponding to the first image and a second image capture device corresponding to the second image, as described with respect to FIG. 3.

One of skill in the art will understand that the method could be implemented by one or more field programmable gate array (FPGA) devices, one or more application specific integrated circuits (ASICs), one or more central processing units (CPUs), one or more digital signal processors (DSP), one or more graphics processing units (GPUs), one or more controllers, one or more other hardware devices, one or more firmware devices, or any combination thereof. In addition, a computer readable medium may stare program instructions that are readable by a computer or processing unit and executable to cause the computer or processing unit to perform at least a portion of the method. For example, a computer readable medium may include a flash memory, EEPROM, ROM, or other non-transient storage that includes code for selecting the first point within a first image based on a variation within image data corresponding to the first image, code for locating the second point within a second image, and code for determining whether a distance between the first point and the second point exceeds the threshold distance.

Figure 15:
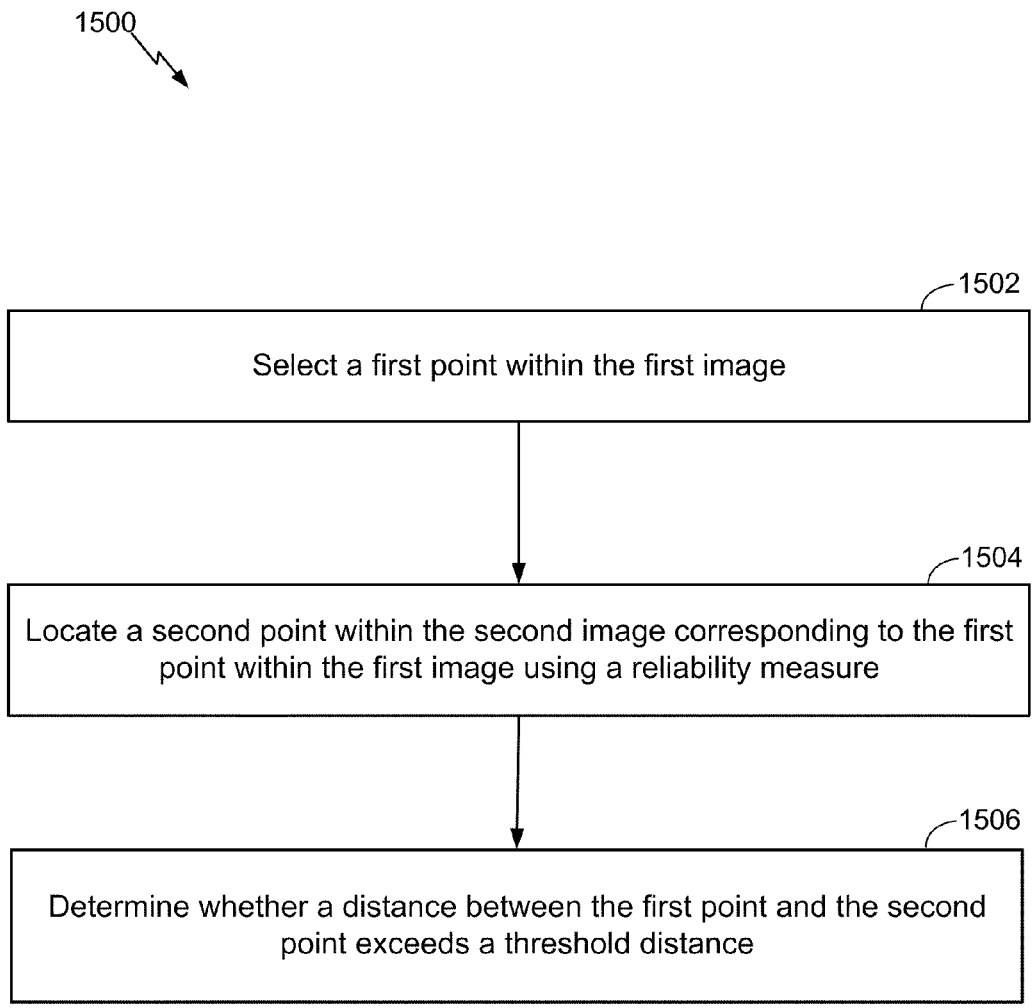
FIG. 15 is a flow diagram of a second embodiment of a method of 3D image processing.

In another embodiment, a method 1500 depicted in FIG. 15 may be performed at a 3D image capture device such as the devices 102, 202, and 302 of FIGS. 1-3, respectively. Alternatively or in addition, the method may be performed at a 3D playback device such as the device 120 of FIG. 1 or at another device that includes one or more of the components 410-426 of FIG. 4 or one or more of the components 602-614 of FIG. 6.

The method may include selecting a first point within a first image, at 1502. The method may also include locating a second point within a second image using a reliability measure, at 1504. The second point may correspond to the first point and the first image and the second image may correspond to a single scene. For example, selecting the first point may be performed at the key point detection module 412 and locating the second point may be performed at the key point matching module 414. The reliability measure may be determined based on a normalized cross-covariance between a first region of the first image that includes the first point and a second region of the second image that includes the second point.

For example, locating the second point may be performed by selecting a first region that includes the first point in the first image and selecting a second region of the second image having a highest determined correlation to the first region. The correlation determination may be performed using luma components of the first image and the second image. The correlation determination may be performed for multiple regions of the second image within a search range of the first point. The reliability measure may correspond to the second region and the second region may be identified as corresponding to the first region based on whether the reliability measure exceeds a reliability threshold.

The method may also include determining whether a distance between the first point and the second point exceeds a threshold distance to be perceptible as a single point of a three-dimensional (3D) rendering of the scene, at 1506. For example, the determination may be performed by the 3D convergence control module 416 of FIG. 4 and may correspond to whether any key point disparity is unfusable during 3D rendering.

One of skill in the art will understand that the method could be implemented by one or more field programmable gate array (FPGA) devices, one or more application specific integrated circuits (ASICs), one or more central processing units (CPUs), one or more digital signal processors (DSP), one or more graphics processing units (GPUs), one or more controllers, one or more other hardware devices, one or more firmware devices, or any combination thereof. In addition, a computer readable medium may stare program instructions that are readable by a computer or processing unit and executable to cause the computer or processing unit to perform at least a portion of the method. For example, a computer readable medium may include a flash memory, EEPROM, ROM, or other non-transient storage that includes code for selecting a first point within a first image, code for locating a second point within a second image using a reliability measure, and code for determining whether a distance between the first point and the second point exceeds a threshold distance to be perceptible as a single point of a three-dimensional (3D) rendering of the scene.

Figure 16:
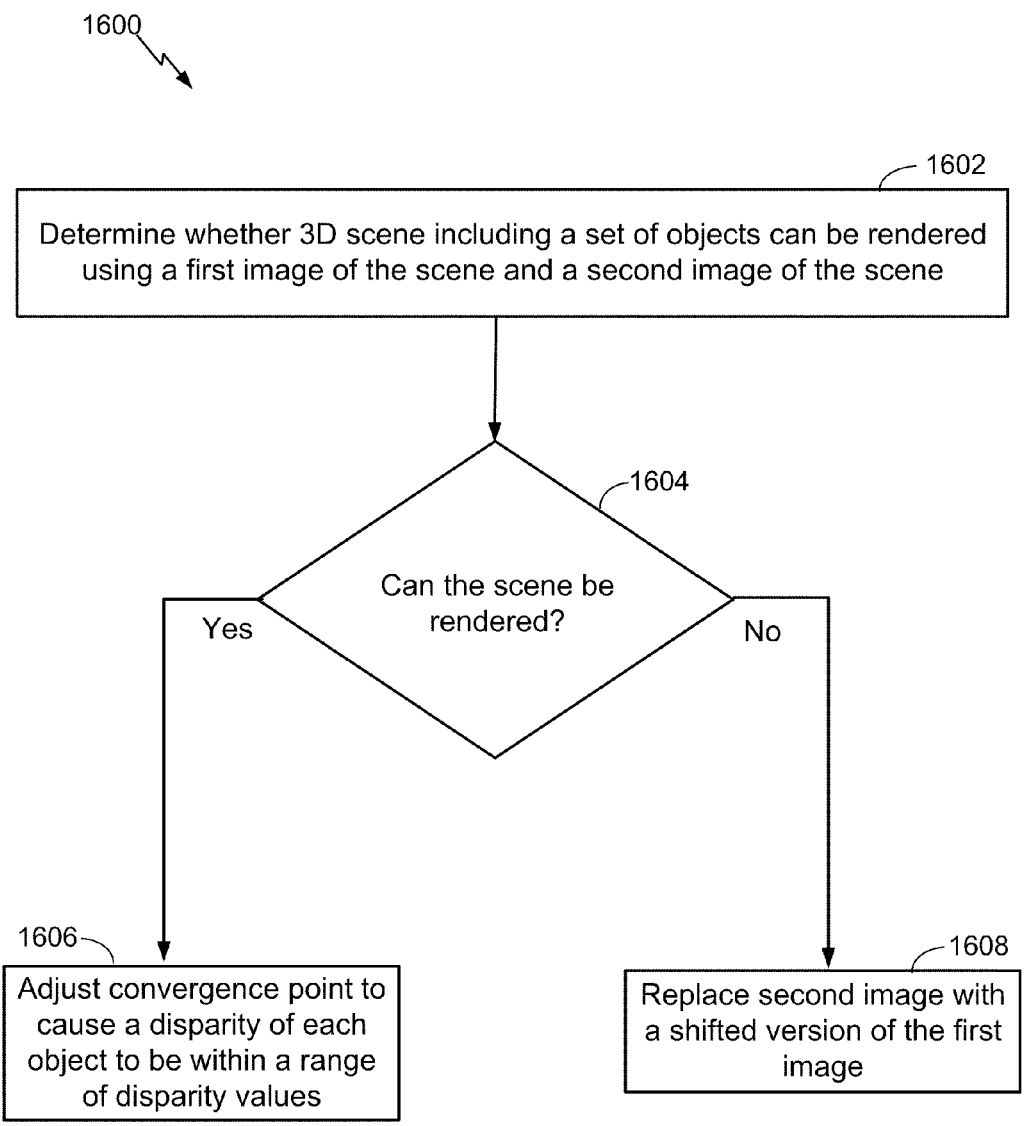
FIG. 16 is a flow diagram of a third embodiment of a method of 3D image processing.

In another embodiment, a method 1600 depicted in FIG. 16 includes determining whether a three-dimensional (3D) scene including a set of objects (e.g. key points located within an image, such as by the key point detection module 412 of FIG. 4) can be rendered using a first image of the scene and a second image of the scene with each object of the set of objects being perceptible as a single object in the 3D scene (e.g. determined to be fusable), at 1602. The method may also include, in response to determining that the 3D scene can be rendered with each object of the set of objects being perceptible as the single object, at 1604, adjusting a convergence point of the scene to cause a disparity of each object of the set of objects to be within a predetermined range of disparity values, at 1606. Adjusting the convergence point of the scene may include shifting at least one of the first image and the second image relative to the other of the first image and the second image to change the disparity of each object of the set of objects, such as by the 3D convergence adjustment module 420 of FIG. 4.

The method may also include, in response to determining that the 3D scene can not be rendered with each object of the set of objects being perceptible as the single object, replacing the second image with a shifted version of the first image, at 1608, such as described with respect to the smart 2D module 420 of FIG. 4.

Determining whether the 3D scene can be rendered with each object of the set of objects being perceptible as the single object may include generating, for each object of the set of objects, a corresponding disparity value indicating a distance between a first location of the object in the first image and a second location of the object in the second image. A range of the disparity values may be compared to a predetermined range of disparity values, such as the maximum disparity range illustrated in FIG. 9. The range of the disparity values excludes at least a largest of the disparity values or a smallest of the disparity values corresponding to the set of objects. For example, a histogram of disparity values may be generated and one or more largest and/or smallest values may be discarded.

One of skill in the art will understand that the method could be implemented by one or more field programmable gate array (FPGA) devices, one or more application specific integrated circuits (ASICs), one or more central processing units (CPUs), one or more digital signal processors (DSP), one or more graphics processing units (GPUs), one or more controllers, one or more other hardware devices, one or more firmware devices, or any combination thereof. In addition, a computer readable medium may stare program instructions that are readable by a computer or processing unit and executable to cause the computer or processing unit to perform at least a portion of the method. For example, a computer readable medium may include a flash memory, EEPROM, ROM, or other non-transient storage that includes code for determining whether a three-dimensional (3D) scene including a set of objects can be rendered using a first image of the scene and a second image of the scene with each object of the set of objects being perceptible as a single object in the 3D scene, and code for, in response to determining that the 3D scene can be rendered with each object of the set of objects being perceptible as the single object, adjusting a convergence point of the scene to cause a disparity of each object of the set of objects to be within a predetermined range of disparity values.

In another embodiment, a device includes a three-dimensional (3D) media player configured to receive input data including at least a first image corresponding to a scene and a second image corresponding to the scene and configured to provide output data to a 3D display device. The 3D media player may be responsive to user input including at least one of a zoom command and a pan command. The 3D media player includes a convergence control module configured to determine a convergence point of a 3D rendering of the scene responsive to the user input. For example, the device may include the 3D processing system 440 of FIG. 4. The device may be implemented as a single chip, as a chipset such as a chipset for a mobile device, or as a mobile device such as a smart phone, photography device, or other type of device.

The convergence control module may be configured to adjust the convergence point on a scene-by-scene basis during playback. The convergence control module may be configured to determine the convergence point based on disparity values of objects in the scene. The convergence point may be determined further based on at least one of a size and a resolution of the 3D display device, a viewing distance from the 3D display device, one or more other factors, or any combination thereof. The disparity values may be determined in pixel units of the 3D display device.

In another embodiment, a device includes an image processing module that is configured to receive image data including first image data corresponding to a first image sensor and second image data corresponding to a second image sensor. For example, the device may be the device 202 of FIG.

2, the device 302 of FIG. 3, or another device that may include components of the 3D processing system 404 of FIG. 4. The image processing module may include a convergence control module configured to determine a convergence point of a 3D rendering of the scene. The image processing module may also include a 3D encoding module configured to generate 3D output data based on an output of the convergence control module.

The convergence control module may be further configured to determine is configured to determine the convergence point based on disparity values of objects in the scene. The convergence control module may also be configured to determine whether the disparity values result in at least one of the objects not being fusable in the 3D rendering. For example, an alert can be generated to inform a user of the device that the scene is not fusable during 3D video capture of the scene, such as the alert 382 of FIG. 3.

The convergence control module can be configured to perform convergence-point processing on a scene-by-scene basis. The convergence-point processing may include adjusting a scene-based convergence point based on disparity values corresponding to objects in the scene and further based on a predetermined display geometry. Convergence-point processing on the scene-by-scene basis can enable dynamic adjustment of the convergence point during a zoom operation performed by the first image sensor and the second image sensors during 3D video capture.

The device may be implemented as a single chip, as a chipset such as a chipset for a mobile device, or as a mobile device such as a smart phone, photography device, or other type of device. For example, the device may also include a video preview display, such as the 3D preview display device 284 of FIG. 2. The predetermined display device geometry may correspond to the video preview display. Alternatively, or in addition, the device geometry may correspond to a display geometry that is selected according to a user input.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    selecting a first point within a first image based on a variation within image data corresponding to the first image;
    locating a second point within a second image, wherein the second point corresponds to the first point and wherein the first image and the second image correspond to a single scene;
    determining whether a distance between the first point and the second point exceeds a threshold distance that the second point can be shifted in a horizontal direction such that the first point and the shifted second point are perceptible as a single point of a three-dimensional (3D) rendering of the scene; and
    in response to determining that the distance exceeds the threshold distance:
        determining a shift amount based on a median disparity of key points in the scene, and
        replacing the second image with a shifted version of the first image, wherein the shifted version of the first image corresponds to the first image shifted by the shift amount.

2. The method of claim 1, wherein each key point corresponds to a selected point within the first image and a corresponding point in the second image.

3. The method of claim 1, further comprising generating an alert that the scene is not fusable in response to determining that the distance exceeds the threshold distance.

4. The method of claim 1, wherein the image data includes subsampled luma data corresponding to the first image.

5. The method of claim 1, wherein the first image corresponds to a first image capture of the scene by a first sensor and the second image corresponds to a second image capture of the scene by a second sensor, wherein the second image capture is concurrent with the first image capture.

6. The method of claim 1, wherein the second point is located using a reliability measure.

7. The method of claim 6, wherein the reliability measure is determined based on a normalized cross-covariance between a first region of the first image that includes the first point and a second region of the second image that includes the second point.

8. The method of claim 6, wherein locating the second point includes:
    selecting a first region that includes the first point in the first image; and
    selecting a second region of the second image having a highest determined correlation to the first region.

9. The method of claim 1, further comprising:
    selecting a third point within the first image; and
    locating a fourth point within the second image that corresponds to the third point using a reliability measure, wherein the first and second points correspond to a first key point and the third and fourth points correspond to a second key point, and wherein the shift amount is based on a median disparity of at least the first and second key points.

10. The method of claim 8, wherein the correlation determination is performed for multiple regions of the second image within a search range of the first point.

11. The method of claim 8, wherein the reliability measure corresponds to the second region and wherein the second region is identified as corresponding to the first region based on whether the reliability measure exceeds a reliability threshold.

12. A method comprising:
- determining whether a three-dimensional (3D) scene including a set of objects can be rendered using a first image of the 3D scene and a second image of the 3D scene with each object of the set of objects being perceptible as a single object in the 3D scene, including for each object of the set of objects:
- generating a corresponding disparity value indicating a distance between a first point of the object in the first image and a second point of the object in the second image; and
- determining whether the distance is within a threshold distance that the second point of the object can be shifted in a horizontal direction such that the first point and the shifted second point of the object are perceptible as a single point in the rendered 3D scene, wherein the threshold distance corresponds to a predetermined range of disparity values; and
- in response to determining that the 3D scene cannot be rendered with each object of the set of objects being perceptible as the single object:
  - determining a shift amount based on a median disparity of key points in the 3D scene, and
  - replacing the second image with a shifted version of the first image, wherein the shifted version of the first image corresponds to the first image shifted by the shift amount.

13. The method of claim 12, further comprising, in response to determining that the 3D scene can not be rendered with each object of the set of objects being perceptible as the single object, generating an alert that the 3D scene is not fusable.

14. The method of claim 12, further comprising, in response to determining that the 3D scene can be rendered with each object of the set of objects being perceptible as the corresponding single object, adjusting a convergence point of the 3D scene to cause a disparity of each object of the set of objects to be within the predetermined range of disparity values.

15. The method of claim 12, wherein determining whether the 3D scene can be rendered with each object of the set of objects being perceptible as the corresponding single object further includes comparing a range of the disparity values to the predetermined range of disparity values.

16. The method of claim 15, wherein the range of the disparity values excludes at least a largest of the disparity values or a smallest of the disparity values corresponding to the set of objects.

17. The method of claim 14, wherein adjusting the convergence point of the 3D scene includes shifting at least one of the first image and the second image relative to the other of the first image and the second image to change the disparity of each object of the set of objects.

18. A device comprising:
- a three-dimensional (3D) media player configured to receive input data including at least a first image corresponding to a scene and a second image corresponding to the scene and configured to provide output data to a 3D display device, wherein the 3D media player is responsive to user input including at least one of a zoom command and a pan command; and
- wherein the 3D media player includes a convergence control module configured, in response to the user input, to:
  - determine whether a distance between a first point in the first image and a second point in the second image exceeds a threshold distance that the second point can be shifted in a horizontal direction such that the first point and the shifted second point are perceptible as a single point in a 3D rendering of the scene, wherein the second point corresponds to the first point; and
  - in response to determining that the distance exceeds the threshold distance:
    - determine a shift amount based on a median disparity of key points in the scene, and
    - replace the second image with a shifted version of the first image, wherein the shifted version of the first image corresponds to the first image shifted by the shift amount.

19. The device of claim 18, wherein the convergence control module is configured to adjust a convergence point on a scene-by-scene basis during playback of a media file.

20. The device of claim 18, wherein the convergence control module is further configured to, in response to determining that the distance exceeds the threshold distance, generate an alert that the scene is not fusable.

21. The device of claim 20, wherein the convergence control module is further configured to determine the convergence point further based on at least one of a size and a resolution of the 3D display device.

22. The device of claim 20, wherein the convergence control module is further configured to determine the convergence point further based on a viewing distance from the 3D display device.

23. The device of claim 18, wherein the distance is determined in pixel units of the 3D display device.

24. A device comprising:
- an image processing module configured to receive image data including first image data corresponding to a first image sensor and second image data corresponding to a second image sensor, wherein the first image data and the second image data correspond to a scene, and wherein the image processing module includes:
- a convergence control module configured to:
  - determine whether a distance between a first point in the first image data and a second point in the second image data exceeds a threshold distance that the second point can be shifted in a horizontal direction such that the first point and the shifted second point are perceptible as a single point in a 3D rendering of the scene, wherein the second point corresponds to the first point; and
  - in response to determining that the distance exceeds the threshold distance:
    - determine a shift amount based on a median disparity of key points in the scene, and
    - replace the second image with a shifted version of the first image, wherein the shifted version of the first image corresponds to the first image shifted by the shift amount; and
- a 3D encoding module configured to generate 3D output data based on an output of the convergence control module.

25. The device of claim 24, wherein the convergence control module is responsive to a predetermined display geometry.

26. The device of claim 24, wherein the convergence control module is further configured to generate an alert that the scene is not fusable.

27. The device of claim 26, wherein the device is further configured to generate the alert to inform a user of the device during 3D video capture of the scene that the scene is not fusable.

28. The device of claim 24, wherein the convergence control module is configured to perform convergence-point processing on a scene-by-scene basis.

29. The device of claim 28, wherein the convergence-point processing includes adjusting a scene-based convergence point further based on a predetermined display geometry.

30. The device of claim 28, wherein the convergence-point processing on the scene-by-scene basis enables dynamic adjustment of the convergence point during a zoom operation performed by the first image sensor and the second image sensor during 3D video capture.

31. The device of claim 29, further comprising a video preview display device, and wherein the predetermined display device geometry corresponds to the video preview display device.

32. The device of claim 29, wherein the predetermined display device geometry corresponds to a display geometry that is selected according to a user input.

33. A non-transitory computer-readable medium comprising instructions that are executable by a processor to:
   select a first point within a first image based on a variation within image data corresponding to the first image;
   locate a second point within a second image, wherein the second point corresponds to the first point and wherein the first image and the second image correspond to a scene; and
   determine whether a distance between the first point and the second point exceeds a threshold distance that the second point can be shifted in a horizontal direction such that the first point and the shifted second point are perceptible as a single point of a three-dimensional (3D) rendering of the scene; and
   in response to determining that the distance exceeds the threshold distance:
      determine a shift amount based on a median disparity of key points in the scene, and
      replace the second image with a shifted version of the first image, wherein the shifted version of the first image corresponds to the first image shifted by the shift amount.

34. The computer-readable medium of claim 33, further comprising instructions that are executable by the processor to generate an alert in response to determining that the distance exceeds the threshold distance.

35. The computer-readable medium of claim 33, wherein the horizontal direction corresponds to a direction between a first image capture device corresponding to the first image and a second image capture device corresponding to the second image.

36. The computer-readable medium of claim 33, wherein the image data includes subsampled luma data corresponding to the first image.

37. The computer-readable medium of claim 33, wherein the first image corresponds to a first image capture of the scene by a first sensor and the second image corresponds to a second image capture of the scene by a second sensor, wherein the second image capture is concurrent with the first image capture.

38. An apparatus comprising:
   means for receiving image data including first image data corresponding to a first image sensor and second image data corresponding to a second image sensor, wherein the first image data and the second image data correspond to a scene;
   means for determining whether a distance between a first point in the first image data and a second point in the second image data exceeds a threshold distance that the second point can be shifted in a horizontal direction such that the first point and the shifted second point are perceptible as a single point in a 3D rendering of the scene, wherein the second point corresponds to the first point; and
   means for replacing a second image with a shifted version of a first image in response to determining that the distance exceeds the threshold distance, the means for replacing comprising means for determining a shift amount based on a median disparity of key points in the scene, wherein the shifted version of the first image corresponds to the first image shifted by the shift amount.

39. The apparatus of claim 38, further comprising means for determining a convergence point of the 3D rendering of the scene, for shifting the second image in the horizontal direction based on the determined convergence point, and for generating 3D output data based on an output of the means for determining the convergence point in response to determining that the distance does not exceed the threshold distance.

40. The apparatus of claim 39, wherein the means for determining the convergence point is responsive to a predetermined display geometry.

* * * * *